(12) United States Patent
Ono et al.

(10) Patent No.: US 10,865,490 B2
(45) Date of Patent: Dec. 15, 2020

(54) CARBON DIOXIDE ELECTROLYTIC DEVICE

(71) Applicant: KABUSHIKI KAISHA TOSHIBA, Minato-ku (JP)

(72) Inventors: Akihiko Ono, Kita (JP); Asahi Motoshige, Ota (JP); Yoshitsune Sugano, Kawasaki (JP); Masakazu Yamagiwa, Yokohama (JP); Jun Tamura, Chuo (JP); Yuki Kudo, Yokohama (JP); Ryota Kitagawa, Setagaya (JP); Satoshi Mikoshiba, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/288,143

(22) Filed: Feb. 28, 2019

(65) Prior Publication Data
US 2020/0087805 A1 Mar. 19, 2020

(30) Foreign Application Priority Data
Sep. 14, 2018 (JP) .................................. 2018-172676

(51) Int. Cl.
*C25B 9/08* (2006.01)
*C25B 15/08* (2006.01)
(Continued)

(52) U.S. Cl.
CPC ................ *C25B 15/08* (2013.01); *C25B 1/10* (2013.01); *C25B 9/10* (2013.01)

(58) Field of Classification Search
CPC .. C25B 9/08; C25B 1/10; C25B 15/08; C25B 1/04; C25B 9/00; C25B 9/10; C25B 9/06;
(Continued)

(56) References Cited

U.S. PATENT DOCUMENTS

| 2016/0108530 A1* | 4/2016 | Masel ................. H01M 8/1023 204/265 |
| 2016/0168730 A1* | 6/2016 | Watanabe ................. C25B 1/02 204/253 |

(Continued)

OTHER PUBLICATIONS

Zengcai Liu, et al., "Electrochemical generation of syngas from water and carbon dioxide at industrially important rates", Journal of $CO_2$ Utilization vol. 15, 2015, 7 pages.
(Continued)

*Primary Examiner* — Zulmariam Mendez
(74) *Attorney, Agent, or Firm* — Oblon, McClelland, Maier & Neustadt, L.L.P.

(57) ABSTRACT

A carbon dioxide electrolytic device comprises an electrolysis cell including: a cathode to reduce a first substance containing carbon dioxide and thus produce a first product containing a carbon compound; a cathode flow path which faces the cathode and through which a gas containing the carbon dioxide flows; an anode to oxidize a second substance containing water or a hydroxide and thus produce a second product containing oxygen; an anode flow path which faces the anode and through which an electrolytic solution containing the water or the hydroxide flows; a water-repellent porous body which faces the anode flow path and through which the second product flows; and a separator provided between the anode and the cathode.

15 Claims, 14 Drawing Sheets

(51) Int. Cl.
*C25B 1/10* (2006.01)
*C25B 9/10* (2006.01)

(58) Field of Classification Search
CPC .... C25B 9/18; C25B 9/16; C25B 3/00; C25B 3/02; C25B 3/04
USPC ........................................................ 204/266
See application file for complete search history.

(56) References Cited

U.S. PATENT DOCUMENTS

2018/0265440 A1   9/2018  Kudo et al.
2018/0274109 A1   9/2018  Kudo et al.

OTHER PUBLICATIONS

Sichao Ma, et al., "Efficient Electrochemical Flow System with Improved Anode for the Conversion of $CO_2$ to CO", Journal of the Electrochemical Society, 161 (10), 2014, pp. F1124-F1131.

* cited by examiner

CARBON DIOXIDE ELECTROLYTIC DEVICE

CROSS REFERENCE TO RELATED APPLICATION

This application is based upon and claims the benefit of priority from Japanese Patent Application No. 2018-172676, filed on Sep. 14, 2018; the entire contents of which are incorporated herein by reference.

FIELD

Embodiments described herein relate generally to a carbon dioxide electrolytic device.

BACKGROUND

In recent years, depletion of fossil fuel such as petroleum or coal has been concerned, and expectation for sustainably-usable renewable energy has been rising. As the renewable energy, a solar cell, wind power generation, and the like can be cited. Because a power generation amount of these depends on weather and a natural situation, there is a problem that it is difficult to realize stable supply of electric power. For this reason, there has been made an attempt to store the electric power generated by the renewable energy in a storage battery, to thereby stabilize the electric power. However, when the electric power is stored, there are problems that a cost is required for the storage battery, and a loss occurs at a time of the storage.

With respect to such points, attention is focused on a technology in which water electrolysis is performed by using the electric power generated by the renewable energy to produce hydrogen ($H_2$) from water, or carbon dioxide ($CO_2$) is electrochemically reduced to be converted into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). When these chemical substances are stored in a cylinder or a tank, there are advantageous points that a storage cost of energy can be reduced, and a storage loss is also small, when compared to a case where the electric power (electric energy) is stored in the storage battery.

As a carbon dioxide electrolytic device, for example, a structure in which an Ag nanoparticle catalyst is used as a cathode, a cathode solution and $CO_2$ gas are brought into contact with the cathode, and an anode solution is brought into contact with an anode is being studied. As a concrete configuration of the electrolytic device, for example, there can be cited a configuration which includes a cathode solution flow path disposed along one surface of the cathode, a $CO_2$ gas flow path disposed along the other surface of the cathode, an anode solution flow path disposed along one surface of an anode, and a separator disposed between the cathode solution flow path and the anode solution flow path. When a reaction of producing, for example, CO from $CO_2$ is performed for a long period of time by using the electrolytic device having such a configuration and, for example, by making a constant current flow through the cathode and the anode, there is a problem that a deterioration over time of a cell performance such that a production amount of CO is reduced or a cell voltage is increased occurs. For this reason, there has been demanded a carbon dioxide electrolytic device capable of suppressing the deterioration over time of the cell performance.

DETAILED DESCRIPTION

A carbon dioxide electrolytic device of an embodiment comprises an electrolysis cell including: a cathode to reduce a first substance containing carbon dioxide and thus produce a first product containing a carbon compound; a cathode flow path which faces the cathode and through which a gas containing the carbon dioxide flows; an anode to oxidize a second substance containing water or a hydroxide and thus produce a second product containing oxygen; an anode flow path which faces the anode and through which an electrolytic solution containing the water or the hydroxide flows; a water-repellent porous body which faces the anode flow path and through which the second product flows; and a separator provided between the anode and the cathode.

Hereinafter, an embodiment will be described with reference to the drawings. In each embodiment presented below, substantially the same components are denoted by the same reference signs, and a description thereof is sometimes partially omitted. The drawings are schematic, and a relationship between a thickness and a planar size, thickness proportions of the respective portions, and the like are sometimes different from actual ones.

First Embodiment

Figure 1:
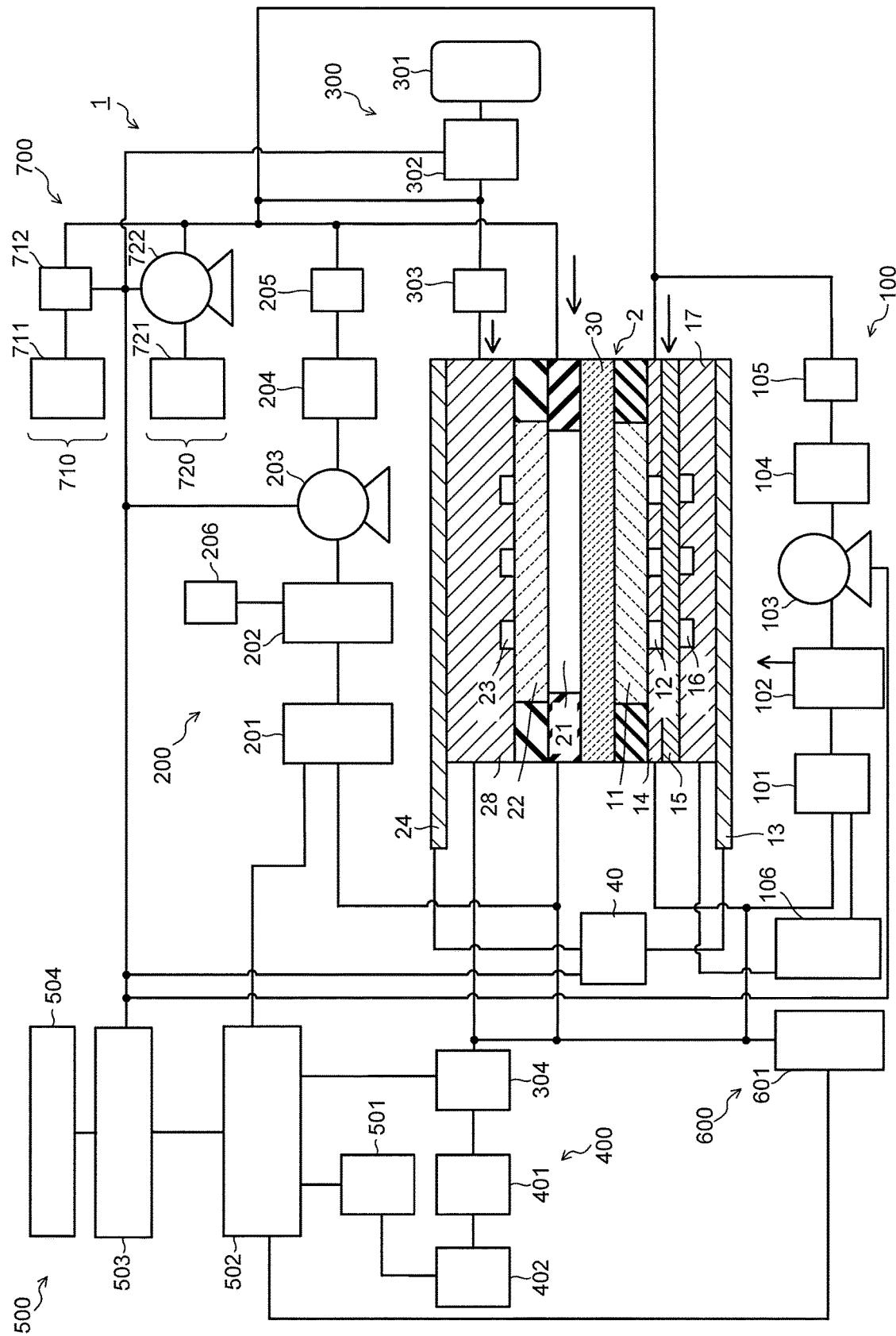
FIG. 1 is a view illustrating an electrolytic device of a first embodiment.
Figure 2:
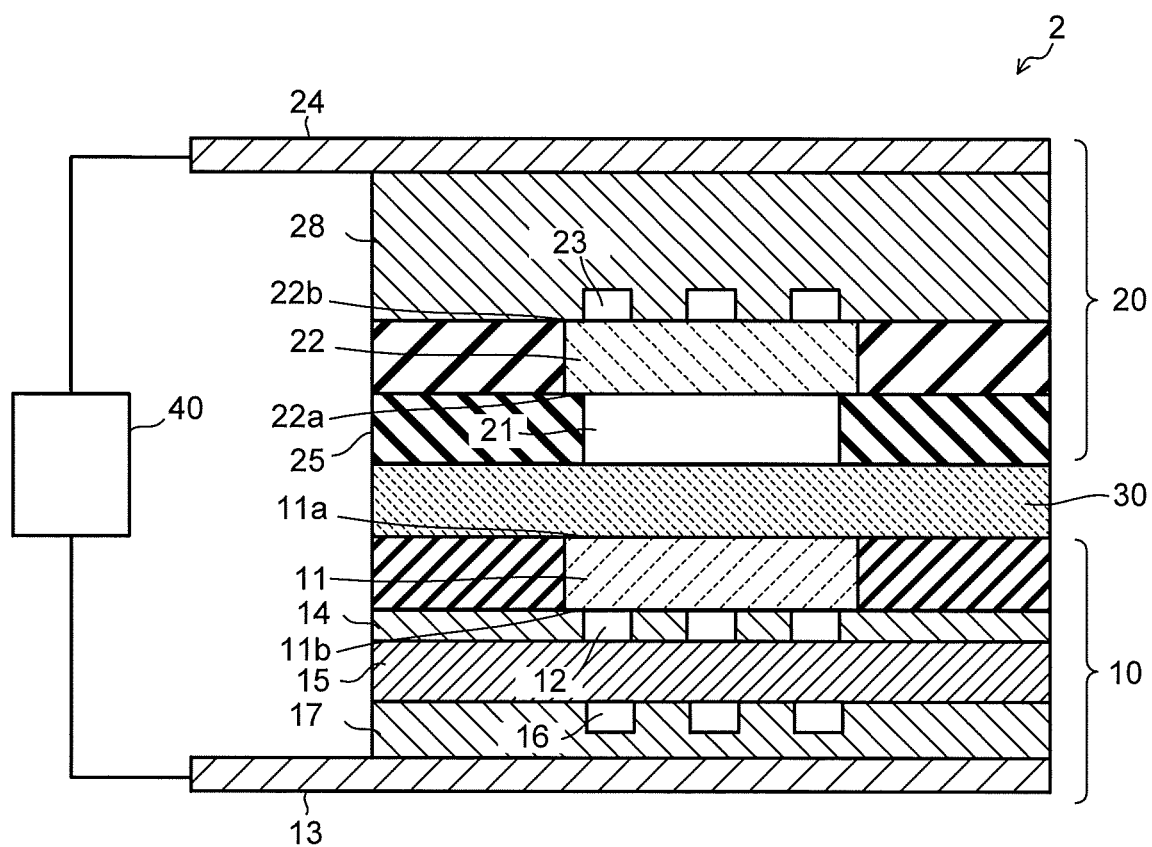
FIG. 2 is a sectional view illustrating an electrolysis cell of the electrolytic device illustrated in FIG. 1.

FIG. 1 is a view illustrating a configuration of a carbon dioxide electrolytic device according to a first embodiment, and FIG. 2 is a sectional view illustrating a configuration of an electrolysis cell in the electrolytic device illustrated in FIG. 1. A carbon dioxide electrolytic device 1 illustrated in FIG. 1 includes an electrolysis cell 2, an anode solution supply system 100 which supplies an anode solution to the electrolysis cell 2, a cathode solution supply system 200 which supplies a cathode solution to the electrolysis cell 2, a gas supply system 300 which supplies carbon dioxide ($CO_2$) gas to the electrolysis cell 2, a product collection system 400 which collects a product produced by a reduction reaction in the electrolysis cell 2, a control system 500 which detects a type and a production amount of the collected product, and performs control of the product and control of a refresh operation, a waste solution collection system 600 which collects a waste solution of the cathode solution and the anode solution, and a refresh material source 700 which recovers an anode, a cathode, or the like of the electrolysis cell 2. Note that a component necessary for the refresh operation need not necessarily be provided.

As illustrated in FIG. 2, the electrolysis cell 2 includes an anode part 10, a cathode part 20, and a separator 30. The anode part 10 includes an anode 11, an anode flow path 12 (anode solution flow path), an anode current collector 13, a water-repellent porous body 15, and an anode flow path 16 (gas venting flow path). The cathode part 20 includes a cathode flow path 21 (cathode solution flow path), a cathode 22, a cathode flow path 23 ($CO_2$ gas flow path), and a cathode current collector 24. The separator 30 is disposed to separate the anode part 10 and the cathode part 20. The anode 11, the anode flow path 12, the anode current collector 13, the water-repellent porous body 15, and the anode flow path 16, and the cathode flow path 21, the cathode 22, the cathode flow path 23, the cathode current collector 24, and the separator 30 may be stacked on one another. Further, the cathode flow path 21 need not be provided. The electrolysis cell 2 is sandwiched by a pair of support plates, which are not illustrated, and further tightened by bolts or the like. In FIG. 1 and FIG. 2, there is provided a power controller 40 which makes a current flow through the anode 11 and the cathode 22. The power controller 40 is connected to the anode 11 and the cathode 22 via a current introduction member. The power controller 40 is not limited to a normal system power supply, battery, or the like, and may be have a power source which supplies electric power generated by renewable energy such as a solar cell or wind power generation. Note that the power controller 40 may also have the aforementioned power source and a power controller or the like that adjusts an output of the aforementioned power source to control a voltage between the anode 11 and the cathode 22.

The anode 11 is provided to oxidize a substance containing water or a hydroxide and thus produce an oxidation product containing oxygen. The anode 11 is an electrode (oxidation electrode) which causes an oxidation reaction of water ($H_2O$) in an anode solution as an electrolytic solution to produce oxygen ($O_2$) or hydrogen ions ($H^+$), or causes an oxidation reaction of hydroxide ions ($OH^-$) produced in the cathode part 20 to produce oxygen ($O_2$) or water ($H_2O$). The anode 11 has a first surface 11a which is brought into contact with the separator 30, and a second surface 11b which faces the anode flow path 12. The first surface 11a of the anode 11 is brought into close contact with the separator 30. The anode flow path 12 faces the anode 11, supplies the anode solution as an electrolytic solution to the anode 11, and is formed of a pit (groove portion/concave portion) provided in a flow path plate 14. The anode solution flows through inside the anode flow path 12 so as to be brought into contact with the anode 11. The anode current collector 13 is electrically brought into contact with a surface on a side opposite to the anode 11 of the flow path plate 14 which forms the anode flow path 12.

The water-repellent porous body 15 is provided between the anode flow path 12 and the anode flow path 16. One surface of the water-repellent porous body 15 faces the anode flow path 12, and a surface on a side opposite to the one surface faces the anode flow path 16. At least the oxidation product such as oxygen passes through the water-repellent porous body 15.

The water-repellent porous body 15 is constituted of, for example, carbon paper, carbon cloth, or the like, and water repellent treatment is performed thereon. A porous body whose pore size is smaller than that of the carbon paper or the carbon cloth (Micro Porous Layer: MPL) may be stacked thereon further. Concretely, it is possible to use the carbon paper impregnated with 10 to 90 mass % of polytetrafluoroethylene (PTFE) manufactured by Toray Industries, Inc. or a porous body having conductivity such as, for example, Sigracet 28BC, 29BC, 38BC, and 39BC manufactured by SGL GmbH & Co. KG or LT-2300 manufactured by E-TEK, Inc. In particular, a porous body with MPL is preferable due to high gas/liquid separation performance. As a nonconductive porous body, for example, a porous body with water repellency of PTFE such as POREFLON manufactured by Sumitomo Electric Industries, Ltd. or the like may be used.

For the water-repellent porous body 15, a porous body having an average pore size of at least 20 μm or less is preferably used. Although a porous body having an average pore size of about 2 to 20 μm is preferable in general, an optimal value thereof varies depending on a degree of water repellency, or the like. A porosity is 50% or more, and preferably, 70% or more is preferable.

The anode flow path 16 is a flow path to discharge a gaseous oxidation product such as oxygen, and is formed of a pit (groove portion/concave portion) provided in a flow path plate 17.

As described above, in the electrolysis cell 2 of the embodiment, the anode 11 and the separator 30 are brought into close contact with each other. In the anode 11, oxygen ($O_2$) is produced, and at this time, in a cell structure in which the separator 30 is sandwiched by the cathode flow path 23 and the anode flow path 12, air bubbles of oxygen ($O_2$) gas generated in the anode 11 stay in the anode flow path 12, and a cell resistance between the anode 11 and the separator 30 increases, this sometimes increases a voltage variation of the anode 11. With respect to a point as above, the anode flow path 12 is not disposed between the anode 11 and the separator 30, and by making the anode 11 and the separator 30 to be brought into close contact with each other or providing the water-repellent porous body 15, oxygen gas generated in the anode 11 is discharged to the anode flow path 16. This makes it possible to prevent the oxygen gas from staying between the anode 11 and the separator 30, and it becomes possible to suppress a variation in a cell voltage due to the voltage variation of the anode 11.

Figure 3:
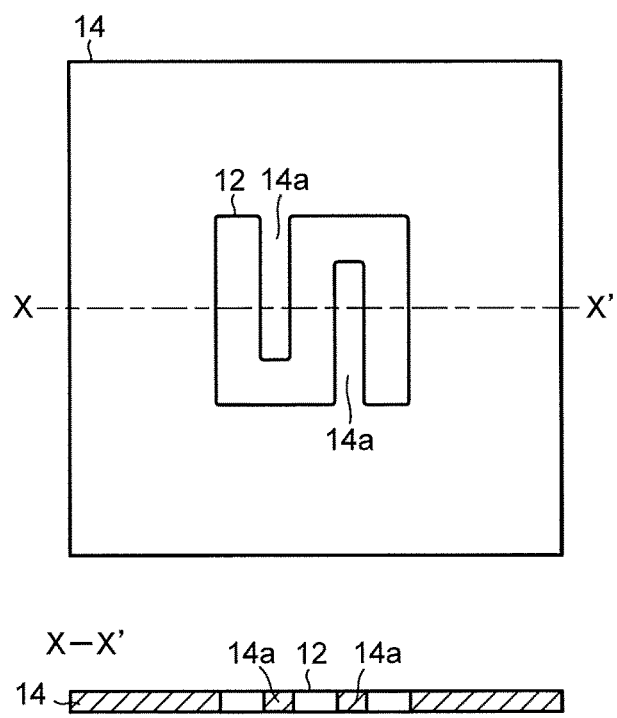
FIG. 3 is a view illustrating one example of an anode flow path in the electrolysis cell illustrated in FIG. 2.

To the flow path plate 14, there are provided a solution inlet port and a solution outlet port whose illustrations are omitted, and the anode solution is introduced and discharged by the anode solution supply system 100 via these solution inlet port and solution outlet port. It is preferable to use a material having low chemical reactivity and high conductivity for the flow path plate 14. As such a material, there can be cited a metal material such as Ti or SUS, carbon, or the like. It is preferable that the anode flow path 12 is provided with a plurality of lands (convex portions) 14a, as illustrated in FIG. 3. The lands 14a are provided for mechanical retention and electrical continuity. The lands 14a are preferably provided in an alternate manner for uniformizing the flow of the anode solution. Since the lands 14a as above are provided, the anode flow path 12 meanders. In addition, also for the purpose of realizing good discharge of the anode solution containing oxygen ($O_2$) gas mixed therein, it is preferable that the lands 14a are provided in an alternate manner to the anode flow path 12 to make the anode flow path 12 meander.

It is preferable that the anode 11 is mainly constituted of a catalyst material (anode catalyst material) capable of oxidizing water ($H_2O$) to produce oxygen or hydrogen ions or oxidizing hydroxide ions ($OH^-$) to produce water or oxygen, and capable of reducing an overvoltage in such a reaction. As such a catalyst material, there can be cited a metal such as platinum (Pt), palladium (Pd), or nickel (Ni), an alloy or an intermetallic compound containing the above metals, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), or a lanthanum oxide (La—O), a ternary metal oxide such as Ni—Co—O, Ni—Fe—O, La—Co—O, Ni—La—O, or Sr—Fe—O, a quaternary metal oxide such as Pb—Ru—Ir—O or La—Sr—Co—O, or a metal complex such as a Ru complex or an Fe complex.

The anode 11 includes a base material having a structure capable of making the anode solution or ions move between the separator 30 and the anode flow path 12, for example, a porous structure such as a mesh material, a punching material, a porous body, or a metal fiber sintered body. The base material may be constituted of a metal such as titanium (Ti), nickel (Ni), or iron (Fe), or a metal material such as an alloy (for example, SUS) containing at least one of these metals, or may be constituted of the above-described anode catalyst material. When an oxide is used as the anode catalyst material, it is preferable to form a catalyst layer in a manner that the anode catalyst material is adhered to or stacked on a surface of the base material made of the above-described metal material. The anode catalyst material preferably has nanoparticles, a nanostructure, a nanowire, or the like for the purpose of increasing the oxidation reaction. The nanostructure is a structure in which nanoscale irregularities are formed on a surface of the catalyst material.

The cathode 22 is provided to reduce a substance containing carbon dioxide and thus produce a reduction product containing a carbon compound. The cathode 22 is an electrode (reduction electrode) which causes a reduction reaction of carbon dioxide ($CO_2$) or a reduction reaction of a carbon compound produced thereby to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). In the cathode 22, there is a case where a side reaction in which hydrogen ($H_2$) is produced by a reduction reaction of water ($H_2O$) is caused simultaneously with the reduction reaction of carbon dioxide ($CO_2$). The cathode 22 has a first surface 22a facing the cathode flow path 21, and a second surface 22b facing the cathode flow path 23. The cathode flow path 21 is disposed between the cathode 22 and the separator 30 so that the cathode solution as an electrolytic solution is brought into contact with the cathode 22 and the separator 30.

The cathode flow path 21 faces the cathode 22, is formed of an opening portion provided in a flow path plate 25. To the flow path plate 25, there are provided a solution inlet port and a solution outlet port whose illustrations are omitted, and the cathode solution is introduced and discharged as the electrolytic solution by the cathode solution supply system 200 via these solution inlet port and solution outlet port. The cathode solution flows through inside the cathode flow path 21 so as to be brought into contact with the cathode 22 and the separator 30. It is preferable to use a material having low chemical reactivity and having no conductivity for the flow path plate 25 forming the cathode flow path 21. As such a material, there can be cited an insulating resin material such as an acrylic resin, polyetheretherketone (PEEK), or a fluorocarbon resin. The cathode flow path 21 need not be provided because it leads to an increase in cell resistance.

Figure 4:
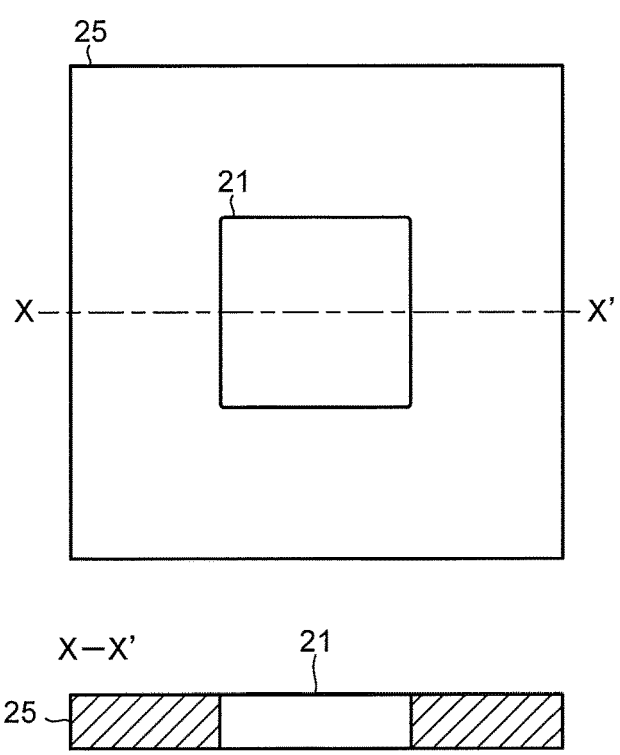
FIG. 4 is a view illustrating one example of a cathode flow path in the electrolysis cell illustrated in FIG. 2.
Figure 5:
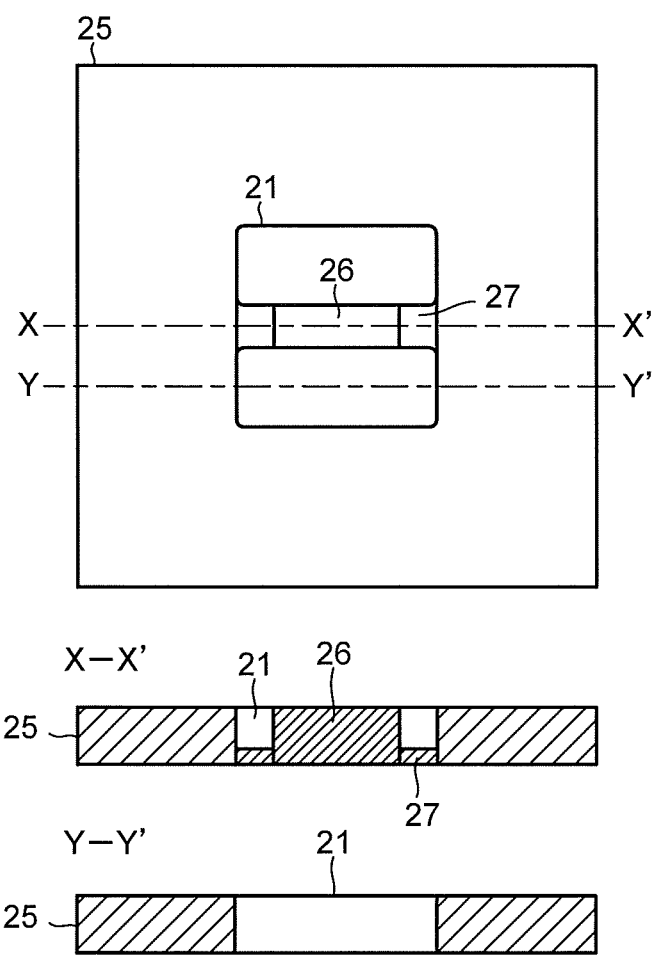
FIG. 5 is a view illustrating another example of the cathode flow path in the electrolysis cell illustrated in FIG. 2.

In the cathode 22, the reduction reaction of $CO_2$ occurs mainly in a portion which is brought into contact with the cathode solution. For this reason, it is preferable to apply an opening portion with a wide opening area to the cathode flow path 21, as illustrated in FIG. 4. However, in order to increase the mechanical retention and the electrical connectivity, it is also possible to provide a land (convex portion) 26 to the cathode flow path 21, as illustrated in FIG. 5. The land 26 of the cathode flow path 21 is provided at a center portion of the cathode flow path 21, and is retained to the flow path plate 25 by a bridge portion 27 which is thinner than the land 26, in order not to prevent the flow of the cathode solution in the cathode flow path 21. When the land 26 is provided to the cathode flow path 21, the number of lands 26 is preferably small in order to reduce the cell resistance.

At least a part of the land 26 preferably overlaps with the lands 14a of the flow path plate 14. This realizes a good electrical connection and allows a reduction in electrical resistance of the electrolysis cell 2. In addition, this realizes good contact of the separator 30, the anode catalyst material, and a cathode catalyst material and makes it possible to efficiently perform not only the reduction in the electrical resistance but also the reaction. Further, at least a part of the anode flow path 16 preferably overlaps with the land 26. This realizes the good electrical connection and allows the reduction in electrical resistance of the electrolysis cell 2. In addition, this realizes the good contact of the separator 30, the anode catalyst material, and the cathode catalyst material and makes it possible to efficiently perform not only the reduction in the electrical resistance but also the reaction.

The cathode flow path 23 faces the cathode 22, is formed of a pit (groove portion/concave portion) provided in a flow path plate 28. It is preferable to use a material having low chemical reactivity and high conductivity for the flow path plate 28 forming a $CO_2$ gas flow path through which a gas containing carbon dioxide flows. As such a material, there can be cited a metal material such as Ti or SUS, carbon, or the like. Note that in each of the flow path plate 14, the flow path plate 25, and the flow path plate 28, an inlet port and an outlet port for a solution or gas, screw holes for tightening, and the like, whose illustrations are omitted, are provided. Further, in front of and behind each of the flow path plates 14, 25, and 28, packing whose illustration is omitted is sandwiched according to need.

Figure 6:
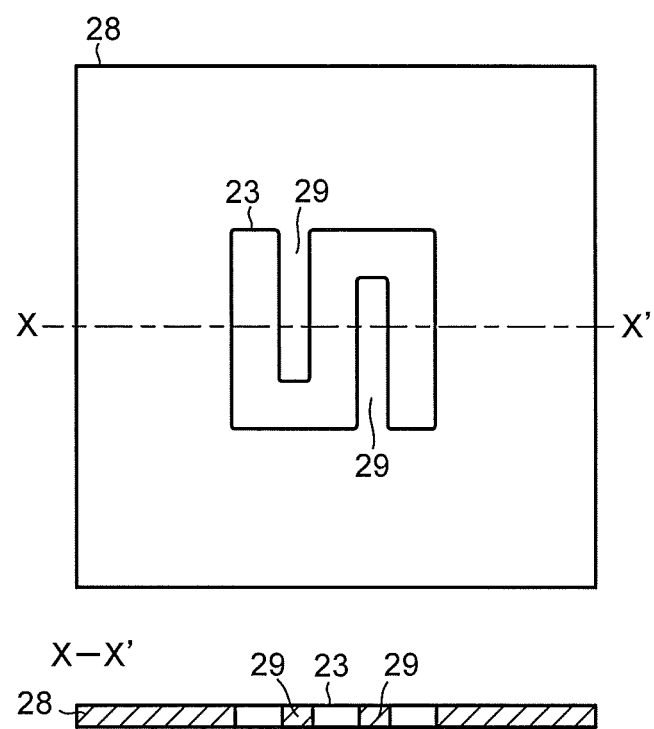
FIG. 6 is a view illustrating one example of the cathode flow path in the electrolysis cell illustrated in FIG. 2.

To the flow path plate 28, a gas inlet port and a gas outlet port whose illustrations are omitted are provided, and $CO_2$ gas or gas containing $CO_2$ (sometimes collectively referred to simply as $CO_2$ gas) is introduced and discharged by the gas supply system 300 via these gas inlet port and gas outlet port. The $CO_2$ gas flows through inside the cathode flow path 23 so as to be brought into contact with the cathode 22. It is preferable that the cathode flow path 23 is provided with a plurality of lands (convex portions) 29, as illustrated in FIG. 6. The lands 29 are provided for mechanical retention and electrical continuity. The lands 29 are preferably provided in an alternate manner, which makes the cathode flow path 23 meander similarly to the anode flow path 12. The cathode current collector 24 is electrically brought into contact with a surface on a side opposite to the cathode 22 of the low path plate 28.

In the electrolysis cell 2 of the embodiment, by providing the lands 14a and 29 to the anode flow path 12 and the cathode flow path 23, it is possible to increase a contact area between the anode 11 and the flow path plate 14 forming the anode flow path 12, and a contact area between the cathode 22 and the flow path plate 28 forming the cathode flow path 23. Further, by providing the land 26 to the cathode flow path 21, it is possible to increase a contact area between the cathode 22 and the flow path plate 25 forming the cathode flow path 21. These realize good electrical continuity between the anode current collector 13 and the cathode current collector 24 while enhancing mechanical retentivity of the electrolysis cell 2, and it becomes possible to improve reduction reaction efficiency of $CO_2$, and the like.

Figure 7:
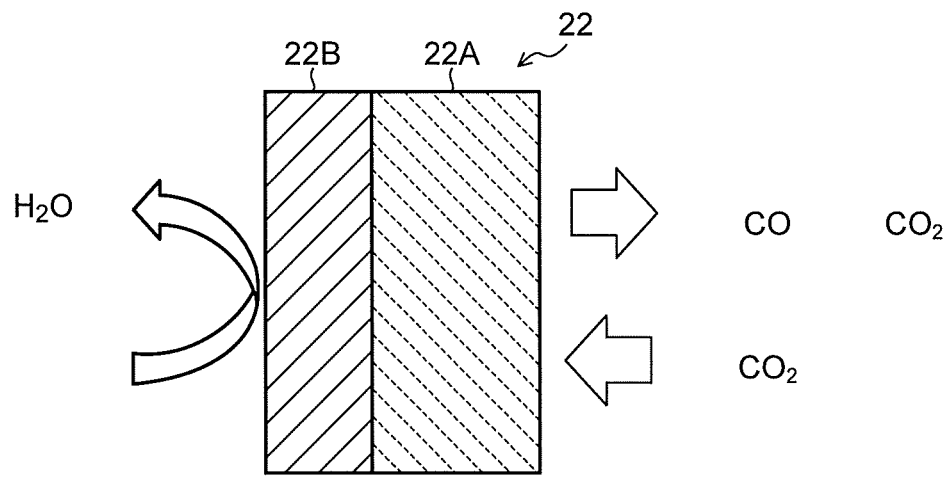
FIG. 7 is a view illustrating one example of a cathode in the electrolysis cell illustrated in FIG. 2.
Figure 8:
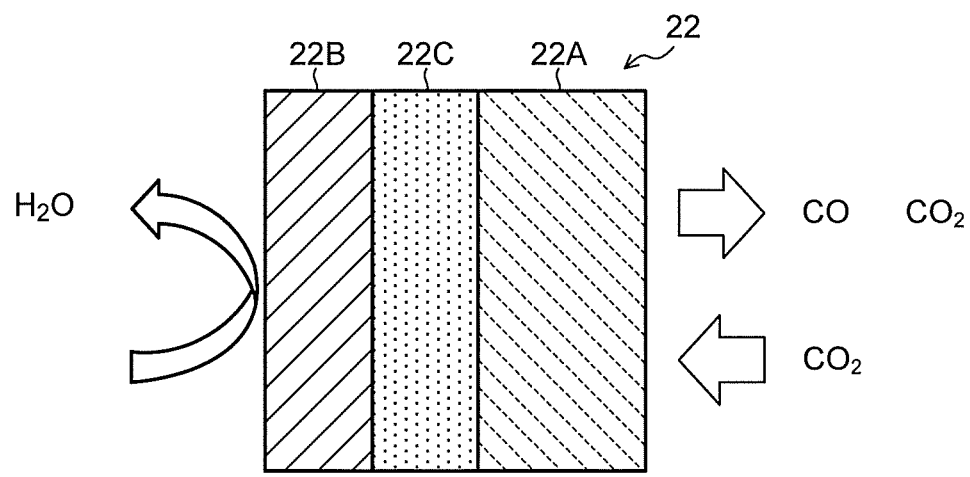
FIG. 8 is a view illustrating another example of the cathode in the electrolysis cell illustrated in FIG. 2.
Figure 9:
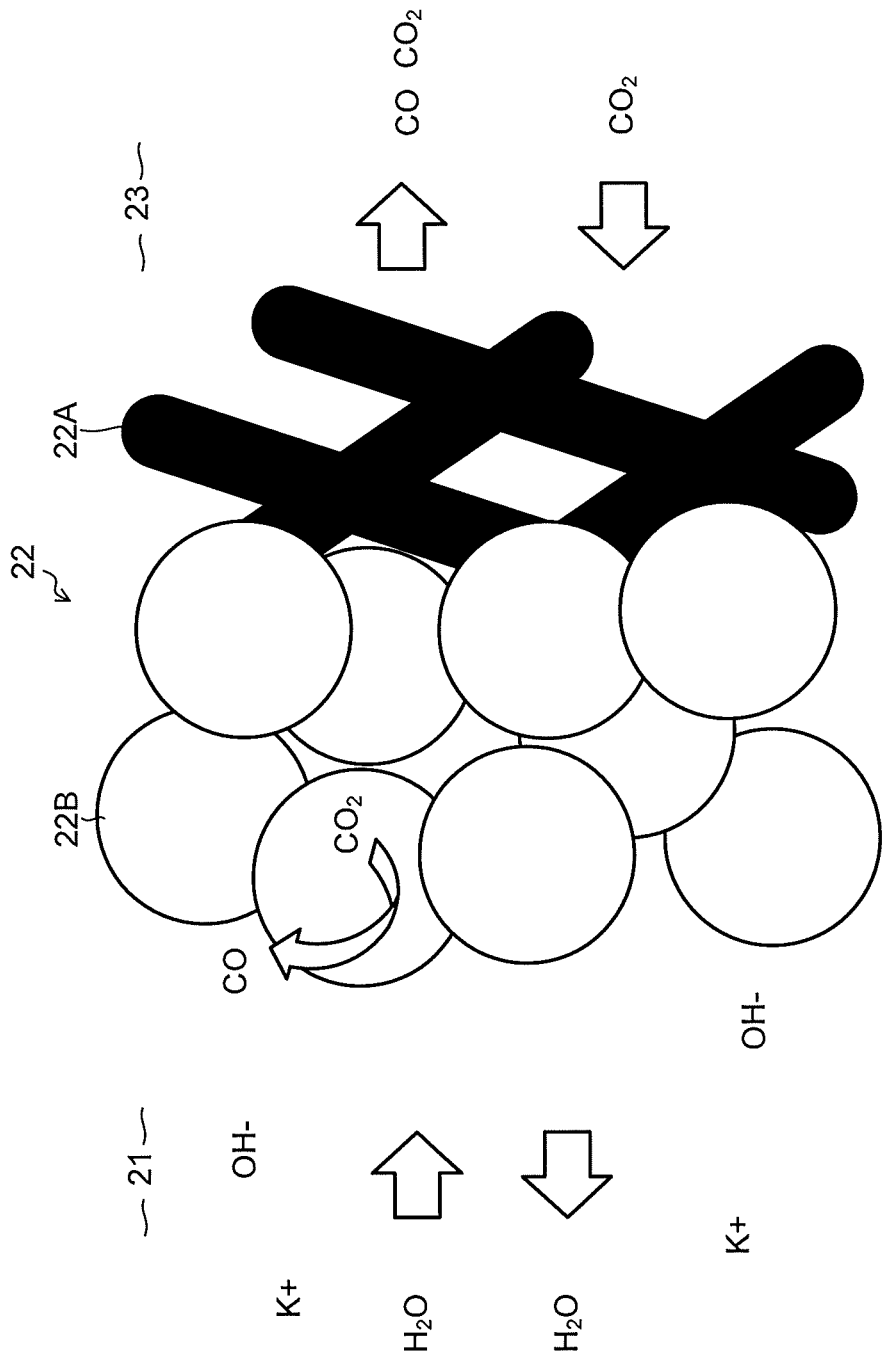
FIG. 9 is a view schematically illustrating a reaction in the cathode in the electrolysis cell illustrated in FIG. 2.

As illustrated in FIG. 7, the cathode 22 has a gas diffusion layer 22A and a cathode catalyst layer 22B provided on the gas diffusion layer 22A. As illustrated in FIG. 8, it is also possible that a porous layer 22C denser than the gas diffusion layer 22A is disposed between the gas diffusion layer 22A and the cathode catalyst layer 22B. As illustrated in FIG. 9, the gas diffusion layer 22A is disposed on the cathode flow path 23 side, and the cathode catalyst layer 22B is disposed on the cathode flow path 21 side. The cathode catalyst layer 22B may enter the gas diffusion layer 22A. The cathode catalyst layer 22B preferably has catalyst nanoparticles, a catalyst nanostructure, or the like. The gas diffusion layer 22A is constituted of, for example, carbon paper, carbon cloth, or the like, and water repellent treatment is performed thereon. The porous layer 22C is constituted of a porous body whose pore size is smaller than that of the carbon paper or the carbon cloth.

As illustrated in a schematic view in FIG. 9, in the cathode catalyst layer 22B, the cathode solution or ions are supplied and discharged from the cathode flow path 21. In the gas diffusion layer 22A, the $CO_2$ gas is supplied from the cathode flow path 23, and a product obtained by the reduction reaction of the $CO_2$ gas is discharged. By previously performing moderate water repellent treatment on the gas diffusion layer 22A, the $CO_2$ gas reaches the cathode catalyst layer 22B mainly through gas diffusion. The reduction reaction of $CO_2$ or the reduction reaction of a carbon compound produced thereby occurs in the vicinity of a boundary between the gas diffusion layer 22A and the cathode catalyst layer 22B or in the vicinity of the cathode catalyst layer 22B which enters the gas diffusion layer 22A, a gaseous product is discharged mainly from the cathode flow path 23, and a liquid product is discharged mainly from the cathode flow path 21.

The cathode catalyst layer 22B is preferably constituted of a catalyst material (cathode catalyst material) capable of reducing carbon dioxide to produce a carbon compound, capable of reducing the carbon compound produced thereby to produce a carbon compound according to need, and capable of reducing an overvoltage in the above reaction. As such a material, there can be cited a metal such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), or tin (Sn), a metal material such as an alloy or an intermetallic compound containing at least one of the above metals, a carbon material such as carbon (C), graphene, CNT (carbon nanotube), fullerene, or ketjen black, or a metal complex such as a Ru complex or a Re complex. The cathode catalyst layer 22B can employ various shapes such as a plate shape, a mesh shape, a wire shape, a particle shape, a porous shape, a thin film shape, and an island shape.

The cathode catalyst material constituting the cathode catalyst layer 22B preferably has nanoparticles of the above-described metal material, a nanostructure of the metal material, a nanowire of the metal material, or a composite body in which the nanoparticles of the above-described metal material are supported by a carbon material such as carbon particles, a carbon nanotube, or graphene. By applying catalyst nanoparticles, a catalyst nanostructure, a catalyst nanowire, a catalyst nano-support structure, or the like as the cathode catalyst material, it is possible to increase reaction efficiency of the reduction reaction of carbon dioxide in the cathode 22.

The separator 30 is provided between the anode 11 and the cathode 22. It is constituted of an ion exchange membrane or the like capable of making ions move between the anode 11 and the cathode 22, and capable of separating the anode part 10 and the cathode part 20. As the ion exchange membrane, it is possible to use, for example, a cation exchange membrane such as Nafion or Flemion, or an anion exchange membrane such as Neosepta or Selemion. As will be described later, when an alkaline solution is used as the anode solution and the cathode solution, and it is assumed that hydroxide ions ($OH^-$) move mainly, the separator 30 is preferably constituted of the anion exchange membrane. However, other than the ion exchange membrane, it is also possible to apply a glass filter, a porous polymeric membrane, a porous insulating material, or the like to the separator 30, as long as they are a material capable of making ions move between the anode 11 and the cathode 22.

Each of the anode solution and the cathode solution as the electrolytic solution is preferably a solution containing at least water ($H_2O$). Because carbon dioxide ($CO_2$) is supplied from the cathode flow path 23, the cathode solution may contain or need not contain carbon dioxide ($CO_2$). To the anode solution and the cathode solution, the same solution may be applied or different solutions may be applied. As a solution containing $H_2O$ used as the anode solution and the cathode solution, an aqueous solution containing an arbitrary electrolyte can be cited. As the aqueous solution containing the electrolyte, there can be cited, for example, an aqueous solution containing at least one selected from a hydroxide ion ($O^-$), a hydrogen ion ($H^+$), a potassium ion ($K^+$), a sodium ion ($Na^+$), a lithium ion ($Li^+$), a chloride ion ($Cl^-$), a bromide ion ($Br^-$), an iodide ion ($F^-$), a nitrate ion ($NO_3^-$), a sulfate ion ($SO_4^{2-}$), a phosphate ion ($PO_4^{2-}$), a borate ion ($BO_3^{3-}$), and a hydrogen carbonate ion ($HCO_3^-$). In order to reduce an electrical resistance of the electrolytic solution, it is preferable to use, as the anode solution and the cathode solution, an alkaline solution in which an electrolyte such as a potassium hydroxide or a sodium hydroxide is dissolved in high concentration.

For the cathode solution, it is also possible to use an ionic liquid which is made of salts of cations such as imidazolium ions or pyridinium ions and anions such as $BF_4^-$ or $PF_6^-$ and which is in a liquid state in a wide temperature range, or its aqueous solution. As another cathode solution, there can be cited an amine solution of ethanolamine, imidazole, pyridine, or the like, or an aqueous solution thereof. As amine, any of primary amine, secondary amine, and tertiary amine is applicable.

To the anode flow path 12 of the anode part 10, the anode solution is supplied as an electrolytic solution from the anode solution supply system 100. The anode solution supply system 100 circulates the anode solution so that the anode solution flows through inside the anode flow path 12. The anode solution supply system 100 has a pressure controller 101, an anode solution tank 102, a flow rate controller (pump) 103, a reference electrode 104, a pressure gauge 105, and a tank 106, and is configured to make the anode solution circulate in the anode flow path 12. The anode solution tank 102 is connected to a not-illustrated gas component collection unit which collects a gas component such as oxygen ($O_2$) contained in the circulating anode solution. The anode solution is introduced into the anode flow path 12 after a flow rate and a pressure thereof are controlled in the pressure controller 101 and the flow rate controller 103.

The tank 106 is provided to house the oxidation product discharged via the water-repellent porous body 15. The tank 106 is connected to, for example, a discharge flow path to discharge the oxidation product from the anode flow path 16. Further, the tank 106 is connected to the anode solution tank 102 via the pressure controller 101. Further, a liquid discharged via the water-repellent porous body 15 may be returned to the anode solution tank 102 via the tank 106 and a circulation flow path. Furthermore, the tank 106 may be connected to the cathode flow path 23 via the refresh material source 700 and the circulation flow path. This makes it possible to use the liquid as a rinse solution when the liquid is housed in the tank 106.

To the cathode flow path 21 of the cathode part 20, the cathode solution is supplied from the cathode solution supply system 200. The cathode solution supply system 200 circulates the cathode solution so that the cathode solution flows through inside the cathode flow path 21. The cathode solution supply system 200 has a pressure controller 201, a cathode solution tank 202, a flow rate controller (pump) 203, a reference electrode 204, and a pressure gauge 205, and is configured to make the cathode solution circulate in the cathode flow path 21. The cathode solution tank 202 is connected to a gas component collection unit 206 which collects a gas component such as carbon monoxide (CO) contained in the circulating cathode solution. The cathode solution is introduced into the cathode flow path 21 after a flow rate and a pressure thereof are controlled in the pressure controller 201 and the flow rate controller 203.

To the cathode flow path 23, the $CO_2$ gas is supplied from the gas supply system 300. The gas supply system 300 has a $CO_2$ gas cylinder 301, a flow rate controller 302, a pressure gauge 303, and a pressure controller 304. The $CO_2$ gas is introduced into the cathode flow path 23 after a flow rate and a pressure thereof are controlled in the flow rate controller 302 and the pressure controller 304. The gas supply system 300 is connected to the product collection system 400 which collects a product in the gas flowed through the cathode flow path 23. The product collection system 400 has a gas/liquid separation unit 401 and a product collection unit 402. A reduction product such as CO or $H_2$ contained in the gas flowed through the cathode flow path 23 is accumulated in the product collection unit 402 via the gas/liquid separation unit 401.

The anode solution and the cathode solution circulate in the anode flow path 12 and the cathode flow path 21 at a time of an electrolytic reaction operation, as described above. At a time of a refresh operation of the electrolysis cell 2 to be described later, the anode solution and the cathode solution are discharged to the waste solution collection system 600 so that the anode 11, the anode flow path 12, the cathode 22, the cathode flow path 21, and the like are exposed from the anode solution and the cathode solution. The waste solution collection system 600 has a waste solution collection tank 601 connected to the anode flow path 12 and the cathode flow path 21. Waste solutions of the anode solution and the cathode solution are collected in the waste solution collection tank 601 by opening and closing not-illustrated valves. The opening and closing of the valves, or the like is controlled collectively by the control system 500. The waste solution collection tank 601 also functions as a collection unit of the rinse solution supplied from the refresh material source 700. Further, a gaseous substance supplied from the refresh material source 700 and containing a part of a liquid substance, is also collected by the waste solution collection tank 601 according to need.

The refresh material source 700 includes a gaseous substance supply system 710 and a rinse solution supply system 720. Note that the rinse solution supply system 720 can be omitted according to circumstances. The gaseous substance supply system 710 has a gas tank 711 to be a supply source of a gaseous substance such as air, carbon dioxide, oxygen, nitrogen, or argon, and a pressure controller 712 which controls a supply pressure of the gaseous substance. The rinse solution supply system 720 has a rinse solution tank 721 to be a supply source of a rinse solution such as water and a flow rate controller (pump) 722 which controls a supply flow rate or the like of the rinse solution. The gaseous substance supply system 710 and the rinse solution supply system 720 are connected to the anode flow path 12, the cathode flow path 21, and the cathode flow path 23 via pipes. The gaseous substance and the rinse solution are supplied to each of the flow paths 12, 21, and 23 by opening and closing not-illustrated valves. The opening and closing of the valves, or the like is controlled collectively by the control system 500.

A part of the reduction product accumulated in the product collection unit 402 is sent to a reduction performance detection unit 501 of the control system 500. In the reduction performance detection unit 501, a production amount and a proportion of each product such as CO or $H_2$ in the reduction product, are detected. The detected production amount and proportion of each product are input into a data collection and controller 502 of the control system 500. Further, the data collection and controller 502 collects electrical data such as a cell voltage, a cell current, a cathode potential, and an anode potential, pressures and pressure losses inside the anode solution flow path and the cathode solution flow path as part of a cell performance of the electrolysis cell 2, and transmits the data to a refresh controller 503.

The data collection and controller 502 is electrically connected, via bi-directional signal lines whose illustration is partially omitted, to the power controller 40, the pressure controller 101 and the flow rate controller 103 of the anode solution supply system 100, the pressure controller 201 and the flow rate controller 203 of the cathode solution supply system 200, the flow rate controller 302 and the pressure controller 304 of the gas supply system 300, and the pressure controller 712 and the flow rate controller 722 of the refresh material source 700, in addition to the reduction performance detection unit 501, and these are collectively controlled. Note that each pipe is provided with a not-illustrated valve, and an opening/closing operation of the valve is controlled by a signal from the data collection and controller 502. The data collection and controller 502 may also control operations of the aforementioned components at a time of an electrolysis operation, for example.

The refresh controller 503 is electrically connected, via bi-directional signal lines whose illustration is partially omitted, to the power controller 40, the flow rate controller 103 of the anode solution supply system 100, the flow rate controller 203 of the cathode solution supply system 200, the flow rate controller 302 of the gas supply system 300, and the pressure controller 712 and the flow rate controller 722 of the refresh material source 700, and these are collectively controlled. Note that each pipe is provided with a not-illustrated valve, and an opening/closing operation of the valve is controlled by a signal from the refresh controller 503. The refresh controller 503 may also control operations of the aforementioned components at a time of the electrolysis operation, for example. Further, it is also possible that the refresh controller 503 and the data collection and controller 502 are configured by one controller.

Figure 10:
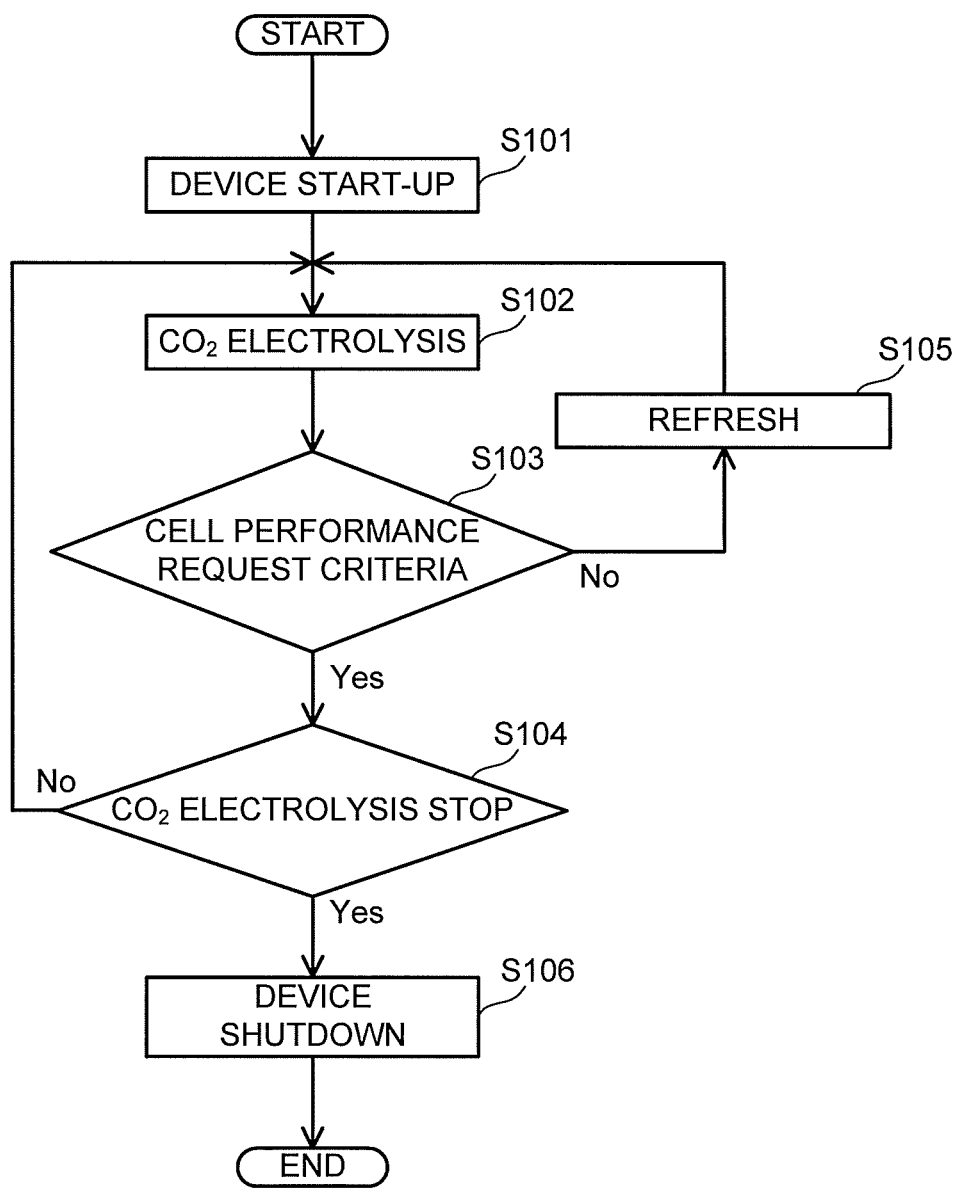
FIG. 10 is a chart illustrating an operation step of the electrolytic device of the first embodiment.

A working operation of the carbon dioxide electrolytic device 1 of the embodiment will be described. First, as illustrated in FIG. 10, a start-up step S101 of the electrolytic device 1 is performed. In the start-up step S101 of the electrolytic device 1, the following operation is performed. In the anode solution supply system 100, a flow rate and a pressure are controlled by the pressure controller 101 and the flow rate controller 103, and the anode solution is introduced into the anode flow path 12. In the cathode solution supply system 200, a flow rate and a pressure are controlled by the pressure controller 201 and the flow rate controller 203, and the cathode solution is introduced into the cathode flow path 21. In the gas supply system 300, a flow rate and a pressure are controlled by the flow rate controller 302 and the pressure controller 304, and $CO_2$ gas is introduced into the cathode flow path 23.

Next, a $CO_2$ electrolysis operation step S102 is performed. In the $CO_2$ electrolysis operation step S102, application of an electrolytic voltage is started by the power controller 40 of the electrolytic device 1 after being subjected to the start-up step S101, and a current is supplied by applying the voltage between the anode 11 and the cathode 22. When the current is made to flow between the anode 11 and the cathode 22, an oxidation reaction in the vicinity of the anode 11 and a reduction reaction in the vicinity of the cathode 22 occur, which will be described below. Here, a case of producing carbon monoxide (CO) as the carbon compound is mainly described, but, the carbon compound as the reduction product of carbon dioxide is not limited to carbon monoxide, and may be other carbon compounds such as the above-described organic compounds. Further, as a reaction process caused by the electrolysis cell 2, there can be considered a case where hydrogen ions ($H^+$) are mainly produced and a case where hydroxide ions ($OH^-$) are mainly produced, but, it is not limited to either of these reaction processes.

First, the reaction process in a case of mainly oxidizing water ($H_2O$) to produce hydrogen ions ($H^+$) is described. When a current is supplied between the anode 11 and the cathode 22 from the power controller 40, an oxidation reaction of water ($H_2O$) occurs in the anode 11 which is brought into contact with the anode solution. Concretely, as presented in the following formula (1), $H_2O$ contained in the anode solution is oxidized, and oxygen ($O_2$) and hydrogen ions ($H^+$) are produced.

$$2H_2O \rightarrow 4H^+ + O_2 + 4e^- \tag{1}$$

$H^+$ produced in the anode 11 moves in the anode solution existing in the anode 11, the separator 30, and the cathode solution in the cathode flow path 21, and reaches the vicinity of the cathode 22. The reduction reaction of carbon dioxide ($CO_2$) occurs by electrons ($e^-$) based on the current supplied from the power controller 40 to the cathode 22 and $H^+$ moved to the vicinity of the cathode 22. Concretely, as presented in the following formula (2), $CO_2$ supplied from the cathode flow path 23 to the cathode 22 is reduced, and CO is produced.

$$2CO_2 + 4H^+ + 4e^- \rightarrow 2CO + 2H_2O \tag{2}$$

Next, the reaction process in a case of mainly reducing carbon dioxide ($CO_2$) to produce hydroxide ions ($OH^-$) is described. When a current is supplied between the anode 11 and the cathode 22 from the power controller 40, in the vicinity of the cathode 22, water ($H_2O$) and carbon dioxide ($CO_2$) are reduced, and carbon monoxide (CO) and hydroxide ions ($OH^-$) are produced, as presented in the following formula (3). The hydroxide ions ($OH^-$) diffuse to the vicinity of the anode 11, and as presented in the following formula (4), the hydroxide ions ($OH^-$) are oxidized, and oxygen ($O_2$) is produced.

$$2CO_2 + 2H_2O + 4e^- \rightarrow 2CO + 4OH^- \tag{3}$$

$$4OH^- \rightarrow 2H_2O + O_2 + 4e^- \tag{4}$$

The air bubbles of the oxygen gas generated in the anode 11 reduce an active area of the anode catalyst material. An oxidation reaction is caused by contact of the anode solution and the anode catalyst material, but a contact area of the anode solution and the anode catalyst material is reduced by the air bubbles, resulting in a reduction in efficiency of the reaction. Further, a gas-liquid two-layer flow is formed, so that a pressure loss of the anode flow path 12 increases, a pump output increases, and energy of the system is lost. Accordingly, the entire efficiency is reduced. Further, when the anode flow path 12 has parallel flow paths, a generation amount of air bubbles varies in the anode flow path 12, and the flow rates of the anode solutions flowing through the respective flow paths and the contact areas with the anode catalyst material are different, thereby resulting in that a reaction density distribution on a reaction surface of the electrolysis cell 2 is different and electrolysis efficiency of the electrolysis cell 2 reduces. Furthermore, there occurs a mutual movement of the oxygen gas generated in the anode and the carbon compound on the gas such as $CO_2$ in cathode 22 via the separator 30, what is called, a crossover, which leads to a rise in a cell voltage. In particular, the above is remarkable when not an ion exchange membrane but a porous body is used as the separator 30. In a stack formed by stacking the electrolysis cells 2, a pressure loss is different for each of the electrolysis cells 2, and the flow rates of the anode solutions flowing through the respective electrolysis cells and the contact areas with the anode catalyst materials are different, thereby resulting in that an output for each of the electrolysis cells is different, so that efficiency of the entire system reduces.

In the electrolytic device of the embodiment, by providing the water-repellent porous body 15 facing the anode flow path 12, the air bubbles move to the water-repellent porous body 15 and the air bubbles can be removed from the anode flow path 12. Accordingly, the electrolysis efficiency can be increased by reducing a crossover amount.

The water-repellent porous body 15 has a sheet shape, and by stacking the anode flow path 12 and the sheet-shaped water-repellent porous body 15 and providing the anode flow path 16 on a side opposite to the anode flow path 12 of the water-repellent porous body 15, gas of the oxidation product can be collected via the anode flow path 16. Further, by performing gas/liquid separation of the oxidation product with the electrolysis cell 2 and collecting the generated gas, the system can be built without providing a gas/liquid separation device outside the electrolysis cell 2, so that it is possible to realize the electrolysis cell 2 having high efficiency and being compact in size and low in cost.

A pressure of the anode flow path 12 is preferably higher than a pressure of the anode flow path 16. Accordingly, the gas of the oxidation product can be collected efficiently, the air bubbles inside the anode flow path 12 move to the anode flow path 16, and it is possible to suppress a reduction in a catalyst active area of the anode 11, so that a cell output can be highly maintained.

Figure 11:
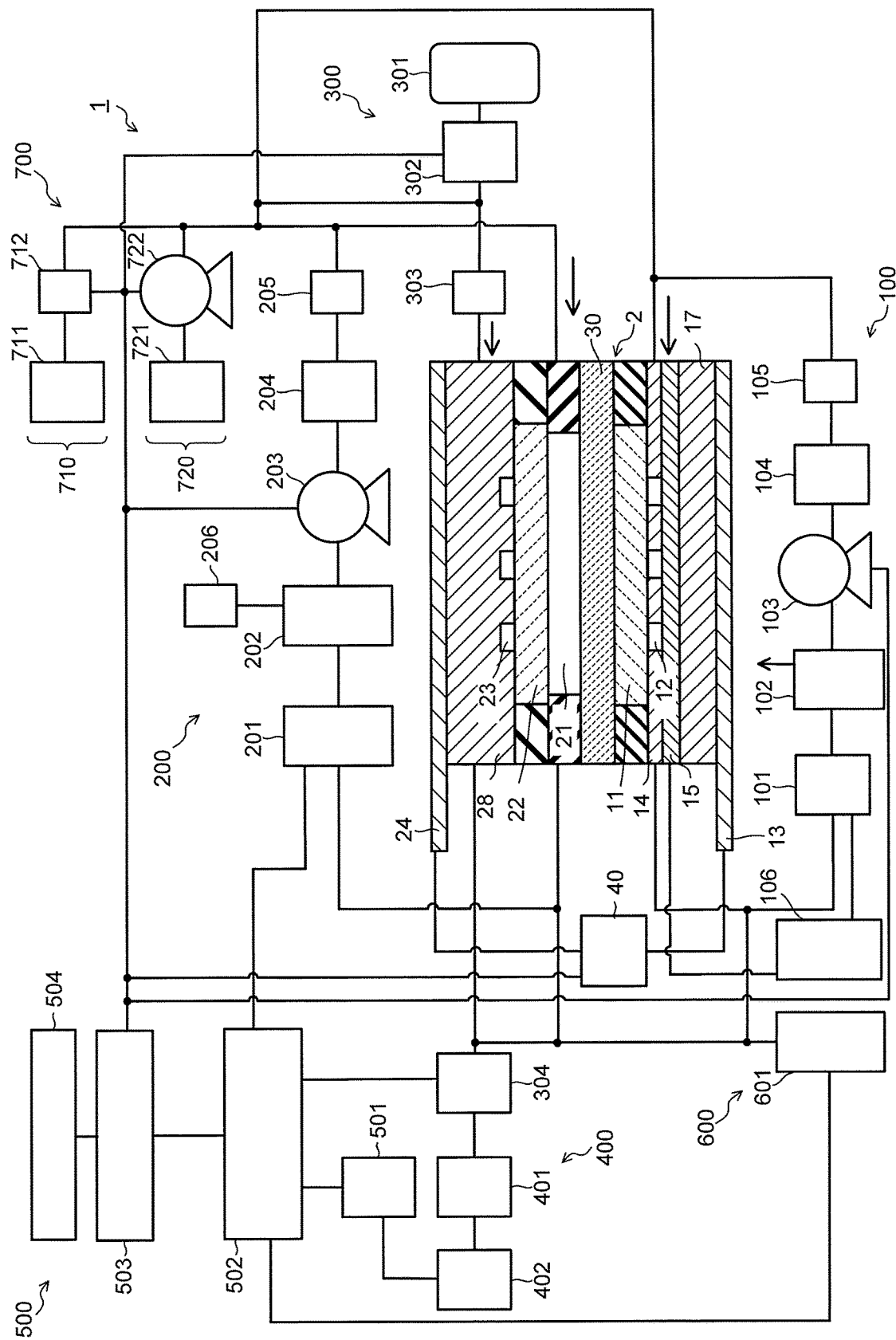
FIG. 11 is a view illustrating another example of the electrolytic device of the first embodiment.

FIG. 11 is a view illustrating another structural example of the electrolysis cell 2. As illustrated in FIG. 11, the anode flow path 16 need not necessarily be provided. When the electrolysis cell 2 has a small cell area or an elongated shape, it is also possible to discharge the gas of the oxidation product from a side surface of the water-repellent porous body 15 via the water-repellent porous body 15. Accordingly, the anode flow path 16 becomes unnecessary, and the electrolysis cell 2 is compact in size and has the small number of members, so that the electrolysis cell 2 can be formed at a low cost. A pressure difference between the anode flow path 12 and the water-repellent porous body 15 at this time is required to be made larger than a pressure loss according to a moving distance of the gas in the water-repellent porous body 15. Further, when the water-repellent porous body 15 has conductivity, it is also possible to directly connect the water-repellent porous body 15 and the anode current collector 13 without providing the flow path plate 17. Further, as long as the flow path plate 17 is formed of an electric conductor, the water-repellent porous body 15 and the anode current collector 13 can also be electrically connected via the flow path plate 17, and electrical connection in a vertical direction to the surface of the electrolysis cell 2 is possible without consideration of electrical resistance in the surface direction of the electrolysis cell 2, resulting in a reduction in electrical resistance of the electrolysis cell 2, which makes it possible to increase efficiency of the electrolysis cell 2. Furthermore, as long as the electrical connection in the vertical direction to the electrolysis cell 2 is possible, a stack of the electrolysis cells 2 becomes possible, and it is possible to realize a high-density stacked-type electrolytic device which has the small number of members and is compact in size.

In a case of the structure illustrated in FIG. 11, the tank 106 is connected to, for example, a discharge flow path to discharge the oxidation product from the water-repellent porous body 15. Further, the tank 106 is connected to the anode solution tank 102 via the pressure controller 101. Furthermore, the tank 106 may be connected to the cathode flow path 23 via the refresh material source 700. Accordingly, when liquid is discharged to be housed with oxygen in the tank 106, the liquid can be used as the rinse solution.

It is also possible to provide the water-repellent porous body 15 having a size equal to that of the flow path plate 14 without providing the anode flow path 16, move the gas of the oxidation product after being subjected to the gas/liquid separation through the water-repellent porous body 15 in the same direction as the flow path surface without providing a gasket, and discharge the gas outside from the electrolysis cell 2. This does not require providing the anode flow path 16, and allows miniaturization. Further, when the conductivity is imparted to the water-repellent porous body 15 and a current is fed from both ends of the electrolysis cell 2, an increase in the stack number of members increases the cell resistance, and the smaller the stack number is, the more the cell performance improves, which is thus preferable. In order to form the stack by stacking the electrolysis cells 2 in particular, it is preferable that the stack number is small.

It is also possible to form at least a part of the flow path plate 14 of a water-repellent porous body, move the oxidation product after being subjected to the gas/liquid separation via the water-repellent porous body 15 in the same direction as the flow path surface without providing a gasket, and discharge the oxidation product outside from the electrolysis cell 2. This prevents the anode solution from soaking into the flow path plate 14, and makes it possible to discharge the gas of the oxidation product via the flow path plate 14, so that commonality of the anode flow path 12 and the anode flow path 16 is possible, which is thus preferable. Even this configuration is preferable from the viewpoint of the miniaturization and the conductivity, as described above. Further, the number of members can be reduced further.

As the water-repellent porous body of the flow path plate 14, a porous body having an average pore size of at least 20 μm or less is used, and a porous body having a pore size of about 2 to 20 μm is preferable in general, but an optimal value thereof is different depending on a degree of water repellency, or the like. A porosity is 50% or more, and preferably, 70% or more is preferable. It is necessary that the water repellency has a contact angle of at least 100 degrees or less.

Figure 12:
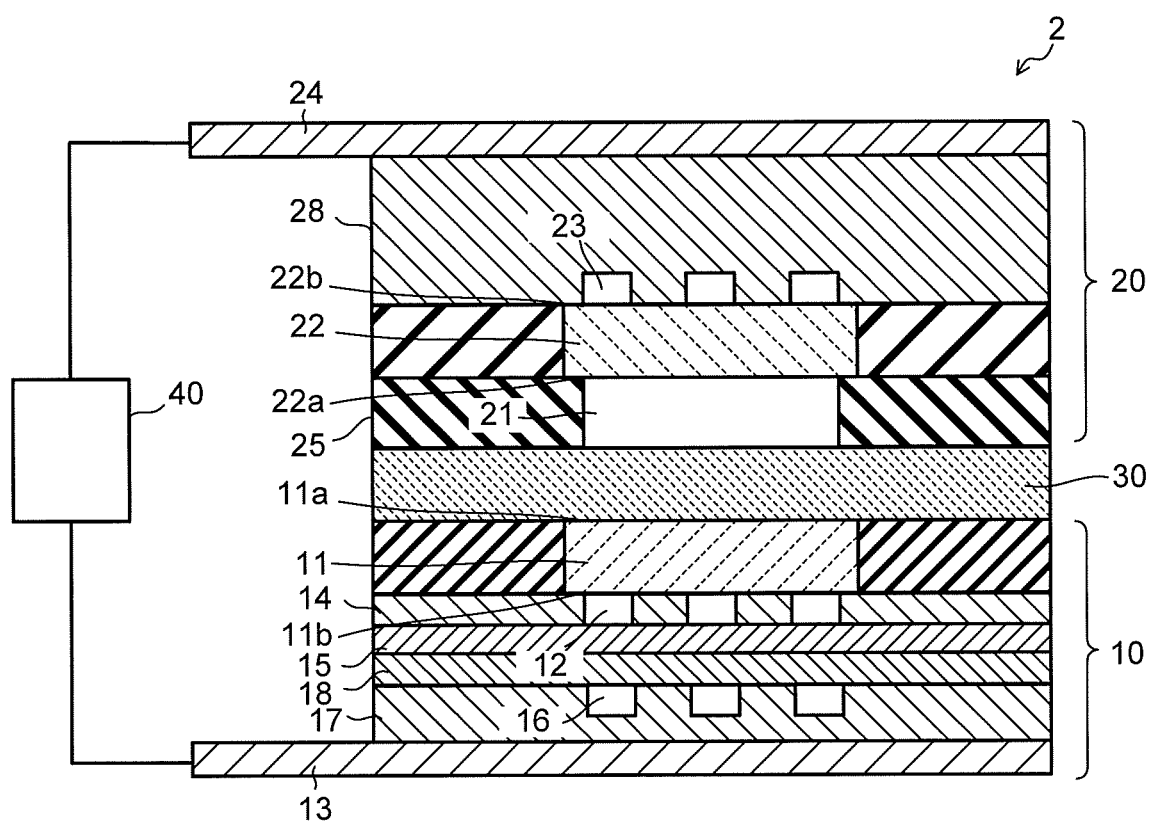
FIG. 12 is a view illustrating another example of the electrolytic cell of the first embodiment.

FIG. 12 is a view illustrating another structural example of the electrolysis cell 2. As illustrated in FIG. 12, a hydrophilic porous body 18 which is brought into contact with the water-repellent porous body 15 may be provided. The hydrophilic porous body 18 is provided, for example, between the water-repellent porous body 15 and the anode flow path 16. By providing the hydrophilic porous body 18, it is possible to perform the gas/liquid separation efficiently and improve separation performance of the gas of the oxidation product and the liquid. Further, the separation performance may be improved by imparting a gradient of the water repellency to the water-repellent porous body 15.

As the hydrophilic porous body 18, there can be used, for example, a porous body of PTF subjected to hydrophilic treatment, such as POREFLON manufactured by Sumitomo Electric Industries, Ltd., a Nuclepore filter and an alumina porous filter such as an Anopore filter of GE Healthcare, a membrane filter of ADVANTEC, or the like. A porous body having an average pore size of at least 50 μm or less can be used. A porosity is 50% or more, and preferably, 65% or more is preferable.

The anode catalyst material is preferable because gas/liquid separation performance is improved by having water repellency, but too high water repellency inhibits contact of the anode catalyst material and the anode solution, and there is a case where a catalyst effective area reduces. Further, there is a case where air bubbles cause a mutual movement phenomenon of gas components between the anode 11 and the cathode 22. Accordingly, the anode catalyst material preferably has a more hydrophilic property than that of the water-repellent porous body 15. Accordingly, movement of gas between the anode 11 and the cathode 22 decreases, so that an amount of carbon dioxide which moves from the cathode 22 to the anode 11 reduces, which makes it possible to reduce an amount of carbon dioxide which dissolves in the anode solution. Consequently, because the variation of pH of the anode 11 can be suppressed, it is possible to stably operate the electrolysis cell 2.

It is also possible to provide a device which cools and aggregates the gas and the liquid discharged from the anode flow path 16 and subjects them to the gas/liquid separation, and to provide a device which supplies the obtained liquid to an inlet port of the cathode flow path 21 at regular time intervals.

When the anode solution and gaseous carbon dioxide are made to react with each other, occurrence of air bubbles in the anode solution makes gas of the generated oxidation product move to the cathode 22 side, and makes a reduction product easily move to the anode 11 side. This phenomenon remarkably occurs particularly in a case of the electrolysis cell 2 having a configuration in which a reaction is made by sandwiching not an ion exchange membrane but a porous body as the separator 30 between the anode 11 and the cathode 22. The aforementioned phenomenon easily causes a reaction in which the reduction product moves to the anode 11 side and oxides again to return to carbon dioxide or a reaction in which the oxidation product is reduced to return to water, so that efficiency of a reaction reduces. In contrast to this, the electrolytic device of the embodiment is capable of suppressing the aforementioned phenomenon and improving the efficiency by providing the water-repellent porous body 15.

In the above-described reaction processes in the cathode 22, the reduction reaction of $CO_2$ is considered to occur in the vicinity of the boundary between the gas diffusion layer 22A and the cathode catalyst layer 22B, as described above. At this time, the cathode solution which flows through the cathode flow path 21 enters up to the gas diffusion layer 22A or the cathode catalyst layer 22B has excess water, which causes a trouble such that the production amount of CO obtained by the reduction reaction of $CO_2$ reduces or the cell voltage increases. The reduction in the cell performance of the electrolysis cell 2 as above is also caused by not only deviation of distribution of ions and residual gas in the vicinity of the anode 11 and the cathode 22, the excess water in the cathode catalyst layer 22B, and precipitation of an electrolyte in the cathode 22 and the anode 11, but also precipitation of an electrolyte in the anode flow path 12 and the cathode flow path 21, and the like.

Further, there is a case where the electrolysis operation causes precipitation of salts in the cathode flow path 21 or the gas diffusion layer 22A, which blocks the flow path or reduces the gas diffusibility, resulting in that the cell performance reduces. This is because ions move between the anode 11 and the cathode 22 via the separator 30 or the ion exchange membrane, and the ions react with the gas component. For example, when a potassium hydroxide solution is used as the anode solution, and carbon dioxide gas is used as the cathode gas, potassium ions move from the anode 11 to the cathode 22, and the ions react with carbon dioxide to produce salts of potassium hydroxide, potassium carbonate, or the like. In the cathode flow path 21 or the gas diffusion layer 22A, when an amount of the salts is equal to or less than the solubility, the salts precipitate in the cathode flow path 21 or the gas diffusion layer 22A. When the flow path is blocked, a uniform gas flow in the entire cell is prevented, and the cell performance lowers. In particular, when a plurality of cathode flow paths 21 are provided, the cell performance significantly lowers. Note that there is a case where the performance of the cell itself is improved by partial increase in the gas flow rate and the like. This is because since a gas pressure is increased, the gas component or the like supplied to the catalyst increases or the gas diffusibility increases, which improves the cell performance. In order to detect the reduction in the cell performance as above, a step S103 which determines whether or not the cell performance satisfies the request criteria, is performed.

The data collection and controller 502 collects the production amount and the proportion of each product and the cell performance such as the cell voltage, the cell current, the cathode potential, the anode potential, the pressure inside the anode flow path 12, the pressure inside the cathode flow path 21 in the electrolysis cell 2 regularly or continuously, for example, as described above. Further, in the data collection and controller 502, the request criteria of the cell performance are previously set, and it is determined whether or not collected data satisfies the set request criteria. When the collected data satisfies the set request criteria, the $CO_2$ electrolysis operation S102 is continued without performing a $CO_2$ electrolysis stop (S104). When the collected data does not satisfy the set request criteria, a refresh operation step S105 is performed.

The cell performance collected by the data collection and controller 502 is defined by parameters such as, for example, an upper limit value of a cell voltage when a constant current is made to flow through the electrolysis cell 2, a lower limit value of a cell current when a constant voltage is applied to the electrolysis cell 2, and Faradaic efficiency of the carbon compound produced by the reduction reaction of $CO_2$. Here, the Faradaic efficiency is defined as a proportion of a current contributing to production of an intended carbon compound with respect to an entire current flowed through the electrolysis cell 2. In order to maintain electrolysis efficiency, the refresh operation step S105 may be performed when the upper limit value of the cell voltage when the constant current is made to flow reaches 150% or more, preferably 120% or more of a set value. Further, the refresh operation step S105 may be performed when the lower limit value of the cell current at a time of applying the constant voltage reaches 50% or less, preferably 80% or less of a set value. In order to maintain a production amount of the reduction product such as the carbon compound, the refresh operation step S105 may be performed when the Faradaic efficiency of the carbon compound becomes 50% or less, preferably 80% or less of a set value.

Regarding the determination of the cell performance, for example, when at least one parameter of the cell voltage, the cell current, the Faradaic efficiency of the carbon compound, the pressure inside the anode flow path 12, and the pressure inside the cathode flow path 21 does not satisfy the request criteria, it is determined that the cell performance does not satisfy the request criteria, and the refresh operation step S105 is carried out. Further, it is also possible to set the request criteria of the cell performance by combining two or more of the aforementioned parameters. For example, it is also possible to perform the refresh operation step S105 when neither the cell voltage nor the Faradaic efficiency of the carbon compound satisfies the request criteria. The refresh operation step S105 is performed when at least one of the cell performance does not satisfy the request criteria. In order to stably perform the $CO_2$ electrolysis operation step S102, the refresh operation step S105 is preferably performed at an interval of one hour or more, for example.

If the request criteria of the cell performance are judged based on only one of the cell voltage, the cell current, and the Faradaic efficiency of the carbon compound, when, even in a case where the cell performance improves or does not change, salts precipitate in the flow path or the gas diffusion layer to reduce the output, it is sometimes judged that the refresh is required. In the electrolytic device, it is important to suspect the reduction in the cell performance beforehand, and to perform the refresh operation at an optimum timing. Accordingly, in the electrolytic device of the embodiment, it is preferable that the pressure in the cell (the pressure inside the anode flow path 12, the pressure inside the cathode flow path 21, or the like) is set to one of the parameters for defining the request criteria, to thereby sense the precipitation of salts, and the refresh operation is performed.

When the electrolysis cell 2 mainly produces, for example, CO, in a case of hydrogen, it can be judged that the request criteria of the cell performance are not satisfied when a concentration of hydrogen rises up to at least 2 times and preferably 1.5 times or more as much as that at a normal time. For example, in a case of CO, it can be judged that the request criteria of the cell performance are not satisfied when a concentration of CO drops to at least 0.8 times or less and preferably 0.9 times or less as much as that at a normal time.

Because it is also considered that the carbon compound is produced and water is decomposed by the electrolysis cell 2, the aforementioned standard concentration is arbitrary. For example, when hydrogen and CO are produced at a ratio of 2:1, and methanol is created with the gases by a reactor, a criterion of a concentration change of the reduction product is different from the aforementioned criterion, it can be judged that the request criteria of the cell performance are not satisfied when concentrations of the hydrogen and the carbon compound rise up to at least 1.3 times or more and preferably 1.1 times or more as much as those at a normal time, or drop to at least 0.8 times or less and preferably 0.9 times or less as much as those at a normal time.

When the salts are detected, the salts are discharged by the rinse solution, but when a mass transfer amount is not changed even by the discharge of the salts, it is also possible to judge that a leak occurs in the electrolysis cell 2. The leak from the electrolysis cell 2 also includes, for example, a gas leak from between the cathode 22 and the cathode flow paths 21 and 23, or the like without being limited to a gas leak between the anode 11 and the cathode 22. This gas leak is likely to occur, for example, when the electrolysis cell 2 in which the salts have precipitated is operated under the condition that pressures in the cathode flow paths 21 and 23 are high, for a long time.

The judgment regarding the necessity of the refresh operation is made based on not only the cell voltage, the current value, and the sensing of salts based on a pressure change in the cell, but also the performance of gas/liquid separation between the anode 11 and the cathode 22 when the anode 11 and the cathode 22 are separated by the separator 30, namely, a movement amount of the liquid or the gas between the anode 11 and the cathode 22, an amount of the product, a voltage difference relative to a reference electrode, an estimated value of the Faradaic efficiency from these parameters, and the like. The Faradaic efficiency from the respective parameter values and the necessity of the refresh operation can be comprehensively determined as judgment of the necessity of the refresh operation also from parameters to be described later, and any combination of respective values and any calculation method are applicable.

It is also possible to judge the necessity of the refresh operation based on a flooding degree estimated from respective pieces of cell data, a voltage change, and the like based on an operating method for detecting a flooding performance. Further, it is also possible to take an operating time of the electrolysis cell 2 into consideration. The operating time is not limited to an operating time after the operation is started, but may be an integrated value of the operating time so far, a duration, an operating time after the refresh operation, or further, a calculated value of multiplication between the integrated voltage value and time, or between the current value and the time, or the like, and any combination and calculation method thereof can be applied. Further, the calculated values of these combinations are preferable when compared to the judgment based on simply the duration or the like, since a difference caused by the operating method of the electrolysis cell 2 is taken into consideration. Furthermore, it is also possible to use a variation value of the current or the voltage, a pH value and a change value of the electrolytic solution, oxygen generation amount and variation amount.

It is preferable that the operation of judging the necessity of the refresh operation is performed, and the judgment is made based on the parameter such as a cell voltage at a time of the operation, since it is possible to accurately judge the necessity of the refresh operation, although the working operation time is reduced. Note that a judgment time of the necessity of the refresh operation in this case is preferably at least a half or less of a refresh operation time, more preferably ¼ or less of the refresh operation time, and ideally ¹⁄₁₀ or less of the refresh operation time. Further, regarding the respective parameters for judging the necessity of the refresh operation, respective pieces of data of the electrolysis cell 2 are collected via an electronic network, required parameters are derived by the data collection and controllers 502 and analysis units 504 of a plurality of cells, through big data analysis, and analysis of machine learning or the like, the refresh controller 503 is made to update the request criteria of the cell performance defined by the respective parameters for judging the necessity of refresh, and it is possible to constantly perform the best refresh operation.

Figure 13:
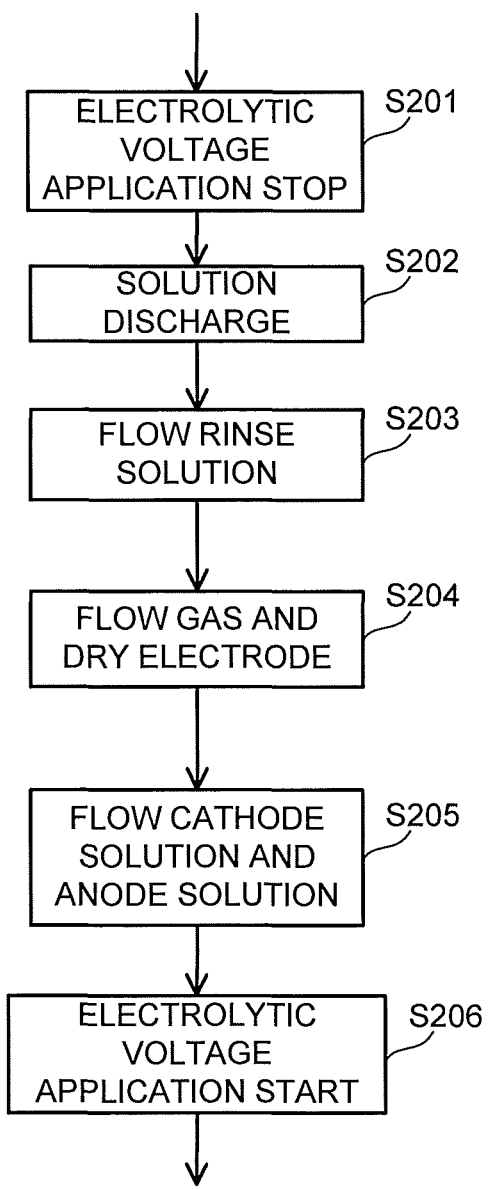
FIG. 13 is a chart illustrating a refresh step of the electrolytic device of the first embodiment.

The refresh operation step S105 is performed according to a flow chart illustrated in FIG. 13, for example. First, the application of the electrolytic voltage performed by the power controller 40 is stopped, to thereby stop the reduction reaction of $CO_2$ (S201). At this time, the application of the electrolytic voltage does not necessarily have to be stopped. Next, the cathode solution and the anode solution are discharged from the cathode flow path 21 and the anode flow path 12 (S202). Next, the rinse solution is supplied to the cathode flow path 21 and the anode flow path 12 (S203), to thereby perform washing.

While the rinse solution is supplied, a refresh voltage may be applied between the anode 11 and the cathode 22. This makes it possible to remove ions and impurities adhered to the cathode catalyst layer 22B. When the refresh voltage is applied so as to perform mainly oxidation treatment, ions and impurities such as organic matters adhered to the surface of the catalyst are oxidized to be removed. Further, by performing this treatment in the rinse solution, it is possible to perform not only the refresh of the catalyst but also removal of ions substituted in an ion-exchange resin in a case of using the ion exchange membrane as the separator 30.

The refresh voltage is preferably not less than −2.5 V nor more than 2.5 V, for example. Since energy is used for the refresh operation, the range of the refresh voltage is preferably as narrow as possible, and the range is more preferably not less than −1.5 V nor more than 1.5 V, for example. The refresh voltage may be cyclically applied so that the oxidation treatment of the ions and the impurities and the reduction treatment are alternately performed. This makes it possible to accelerate regeneration of the ion-exchange resin and regeneration of the catalyst. Further, it is also possible to perform the refresh operation by applying, as the refresh voltage, a voltage whose value is equal to that of the electrolytic voltage at a time of the electrolysis operation. In this case, it is possible to simplify the configuration of the power controller 40.

Next, gas is supplied to the cathode flow path 21 and the anode flow path 12 (S204), to thereby dry the cathode 22 and the anode 11. When the rinse solution is supplied to the cathode flow path 21 and the anode flow path 12, a saturation degree of water in the gas diffusion layer 22A increases, and output reduction occurs due to the diffusibility of gas. By supplying the gas, the saturation degree of water lowers, so that the cell performance is recovered, and the refresh effect is increased. The gas is preferably supplied right after the rinse solution is made to flow, and is preferably supplied at least within five minutes after the finish of supply of the rinse solution. This is because the output reduction is large due to the increase in the saturation degree of water, and if it is assumed that the refresh operation is performed at intervals of an hour, for example, an output during the refresh operation in five minutes is 0 V or significantly small, so that 5/60 of the output is sometimes lost.

When the above refresh operation finishes, the cathode solution is introduced into the cathode flow path 21, the anode solution is introduced into the anode flow path 12, and $CO_2$ gas is introduced into the cathode flow path 23 (S205). Subsequently, the application of the electrolytic voltage between the anode 11 and the cathode 22 performed by the power controller 40 is resumed, to thereby resume the $CO_2$ electrolysis operation (S206). Note that when the application of the electrolytic voltage is not stopped in S201, the aforementioned resume operation is not performed. For the discharge of the cathode solution and the anode solution from each of the flow paths 12 and 21, gas may be used or the rinse solution may be used.

The supply and flow of the rinse solution (S203) are performed for the purpose of preventing precipitation of an electrolyte contained in the cathode solution and the anode solution, and washing the cathode 22, the anode 11, and each of the flow paths 12 and 21. For this reason, as the rinse solution, water is preferable, water having an electric conductivity of 1 mS/m or less is more preferable, and water having the electric conductivity of 0.1 mS/m or less is still more preferable. In order to remove a precipitate such as the electrolyte in the cathode 22, the anode 11, and the like, an acid rinse solution having a low concentration, of sulfuric acid, nitric acid, hydrochloric acid, or the like may be supplied, and the electrolyte may be dissolved by using the acid rinse solution. When the acid rinse solution having a low concentration is used, a step in which the rinse solution of water is supplied is performed in a step thereafter. It is preferable to perform, right before the gas supply step, the supply step of the rinse solution of water, in order to prevent an additive contained in the rinse solution from remaining. FIG. 1 illustrates the rinse solution supply system 720 having one rinse solution tank 721, but, when a plurality of rinse solutions such as water and the acid rinse solution are used, a plurality of rinse solution tanks 721 corresponding thereto are used.

In particular, for the refresh of the ion-exchange resin, acid or alkaline rinse solution is preferable. This provides an effect of discharging cations or anions substituted in place of protons or $OH^-$ in the ion-exchange resin. For this reason, it is preferable that the acid rinse solution and the alkaline rinse solution are made to flow alternately, the rinse solution is combined with water having an electric conductivity of 1 mS/m or less, and gas is supplied between supplies of a plurality of rinse solutions so that the rinse solutions are not mixed.

As the rinse solution, water produced through a reaction may also be used. For example, when CO is produced from $CO_2$ and protons through reduction, water is generated. It is possible that the water discharged from the cathode 22 at this time is separated through gas/liquid separation, and stored to be used. If it is designed as above, there is no need to newly supply the rinse solution from the outside, which is advantageous in terms of system. Further, by changing an electric potential to increase a reaction current, and increasing an amount of water to be produced, the water may also be supplied to the cathode flow path 21. Accordingly, the tank for the produced water, and the pipe, the pump, and the like used for the rinse solution become unnecessary, which provides a configuration that is effective in terms of system. Further, it is also possible that gas containing oxygen is supplied to the cathode flow path 21 and a voltage is applied, to thereby perform water decomposition on the electrolytic solution or the rinse solution of the anode 11, and the refresh operation is performed by using water produced by the catalyst from protons or $OH^-$ ions moved to a counter electrode. For example, in a case where Nafion is used as an ion exchange membrane in an electrolysis cell in which $CO_2$ is reduced to CO by using a gold catalyst, when air is flowed through the cathode 22 and an electric potential is applied to the cell to perform water decomposition, protons moved to the cathode 22 are reacted with oxygen by the catalyst, and water is produced. The refresh operation can be performed by using the produced water. Further, it is also possible that hydrogen gas is generated by supplying gas containing no oxygen to the cathode 22 or stopping the supply of gas thereafter, and the generated hydrogen is used to perform the refresh operation to dry the cathode 22. Accordingly, it is also possible to perform the refresh operation of the catalyst by using reducing power of protons and hydrogen.

The gas used for the gas supply and the flow step S204 preferably contains at least one of air, carbon dioxide, oxygen, nitrogen, and argon. Moreover, gas having low chemical reactivity is preferably used. From such a point, air, nitrogen, and argon are preferably used, and nitrogen and argon are more preferable. The supply of the rinse solution and gas for refresh is not limited only to the cathode flow path 21 and the anode flow path 12, and in order to wash a surface, of the cathode 22, which is brought into contact with the cathode flow path 23, the rinse solution and the gas may be supplied to the cathode flow path 23. It is effective to supply the gas to the cathode flow path 23 in order to dry the cathode 22 also from the side of the surface which is brought into contact with the cathode flow path 23.

The above is the description regarding the case where the rinse solution and gas for refresh are supplied to both the anode part 10 and the cathode part 20, but, the rinse solution and gas for refresh may be supplied to only one of the anode part 10 and the cathode part 20. For example, the Faradaic efficiency of the carbon compound varies depending on a contact region between the cathode solution and $CO_2$ in the gas diffusion layer 22A and the cathode catalyst layer 22B of the cathode 22. In such a case, only by supplying the rinse solution and gas for refresh to only the cathode part 20, the Faradaic efficiency of the carbon compound is sometimes recovered. Depending on a type of the electrolytic solutions (anode solution and cathode solution) to be used, there is sometimes a tendency that precipitation easily occurs in one of the anode part 10 and the cathode part 20. Based on such a tendency of the electrolytic device 1, the rinse solution and gas for refresh may be supplied to only one of the anode part 10 and the cathode part 20. Moreover, depending on an operating time or the like of the electrolytic device 1, the cell performance is sometimes recovered only by drying the anode 11 and the cathode 22. In such a case, it is also possible to supply only the gas for refresh to at least one of the anode part 10 and the cathode part 20. The refresh operation step S105 can be changed in various ways according to an operation condition, a tendency, and the like of the electrolytic device 1.

As described above, in the electrolytic device 1 of the first embodiment, based on whether or not the cell performance of the electrolysis cell 2 satisfies the request criteria, it is determined whether the $CO_2$ electrolysis operation step S102 is continued or the refresh operation step S105 is performed. By supplying the rinse solution and gas for refresh in the refresh operation step S105, the entry of the cathode solution into the gas diffusion layer 22A, the excess water of the cathode catalyst layer 22B, the deviation of the distribution of the ions and the residual gas in the vicinity of the anode 11 and the cathode 22, the precipitation of the electrolyte in the cathode 22, the anode 11, the anode flow path 12, and the cathode flow path 21, and the like, which become causes of reducing the cell performance, are removed. Therefore, by resuming the $CO_2$ electrolysis operation step S102 after the refresh operation step S105, the cell performance of the electrolysis cell 2 can be recovered. By repeating the $CO_2$ electrolysis operation step S102 and the refresh operation step S105 as above based on the request criteria of the cell performance, it becomes possible to maintain the $CO_2$ electrolysis performance obtained by the electrolytic device 1 for a long period of time.

There is a problem that cations in the electrolytic solution move from the anode 11 to the cathode 22 and react with $CO_2$ in the cathode 22 to thereby produce salts, and the cathode flow path 23 or the gas diffusion layer is clogged and blocked with the salts to thereby stop the reaction. Therefore, it is considered that by providing a tank such as a pure water tank and supplying pure water or the like from a cathode inlet to the cathode at timing of precipitation of the salts, the salts are dissolved to prevent the block of the flow path, but there is poor maintainability such as supply of water after use. Further, when the anode solution is used, an anode solution component and $CO_2$ gas react with each other, so that it is not preferable to discharge the salts by using the solution having a salt component from the viewpoint of solubility. Moreover, since the anode solution is circulated, it contains impurities discharged from the electrolysis cell 2 or impurities caused by the reaction, which is not therefore preferable. Consequently, water discharged from the anode flow path 16 is, so to speak, distilled by the water-repellent porous body 15, has a concentration lower than that of the anode solution, and becomes liquid having components close to those of the pure water in which the impurities are removed, so that the operation is made without supplying the pure water or preparing the pure water for the refresh of the cathode 22, which is therefore preferable in terms of system.

The water in the anode solution is discharged from the water-repellent porous body 15 correspondingly to a vapor pressure at a cell temperature. Meanwhile, there occurs a phenomenon in which salts are precipitated in the cathode flow path 23 by the reaction of the cathode solution and carbon dioxide in the cathode 22, and the refresh operation in which water is introduced into the cathode flow path 23 for the purpose of the dissolution of the salts to remove the salts, is performed, and using the water discharged from the anode flow path 16 does not require to prepare water for rinse, and due to the absence of increase and decrease in water all over the reaction system in a case of the oxidation reaction of water and producing CO, such a configuration is preferable for a sustained operation without the increase and decrease in water all over the system. Further, the water discharged from the anode flow path 16 is returned to the anode solution tank 102, and a long-time sustained operation becomes possible without reducing the anode solution. At this time, there is also an effect of preventing the anode solution from reducing to change an electrolytic solution component concentration, which has more effect on a stable operation.

Second Embodiment

Figure 14:
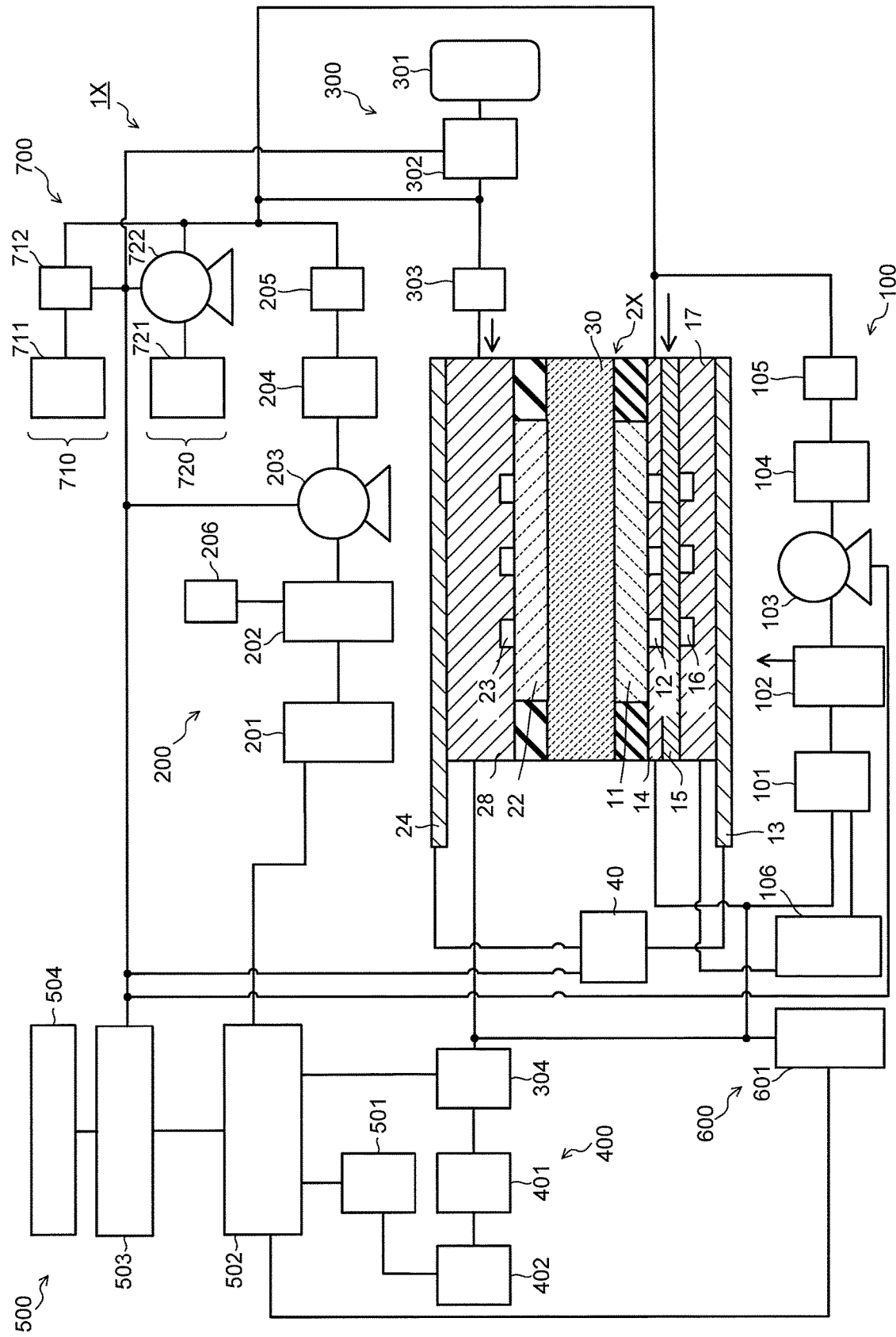
FIG. 14 is a view illustrating an electrolytic device of a second embodiment.
Figure 15:
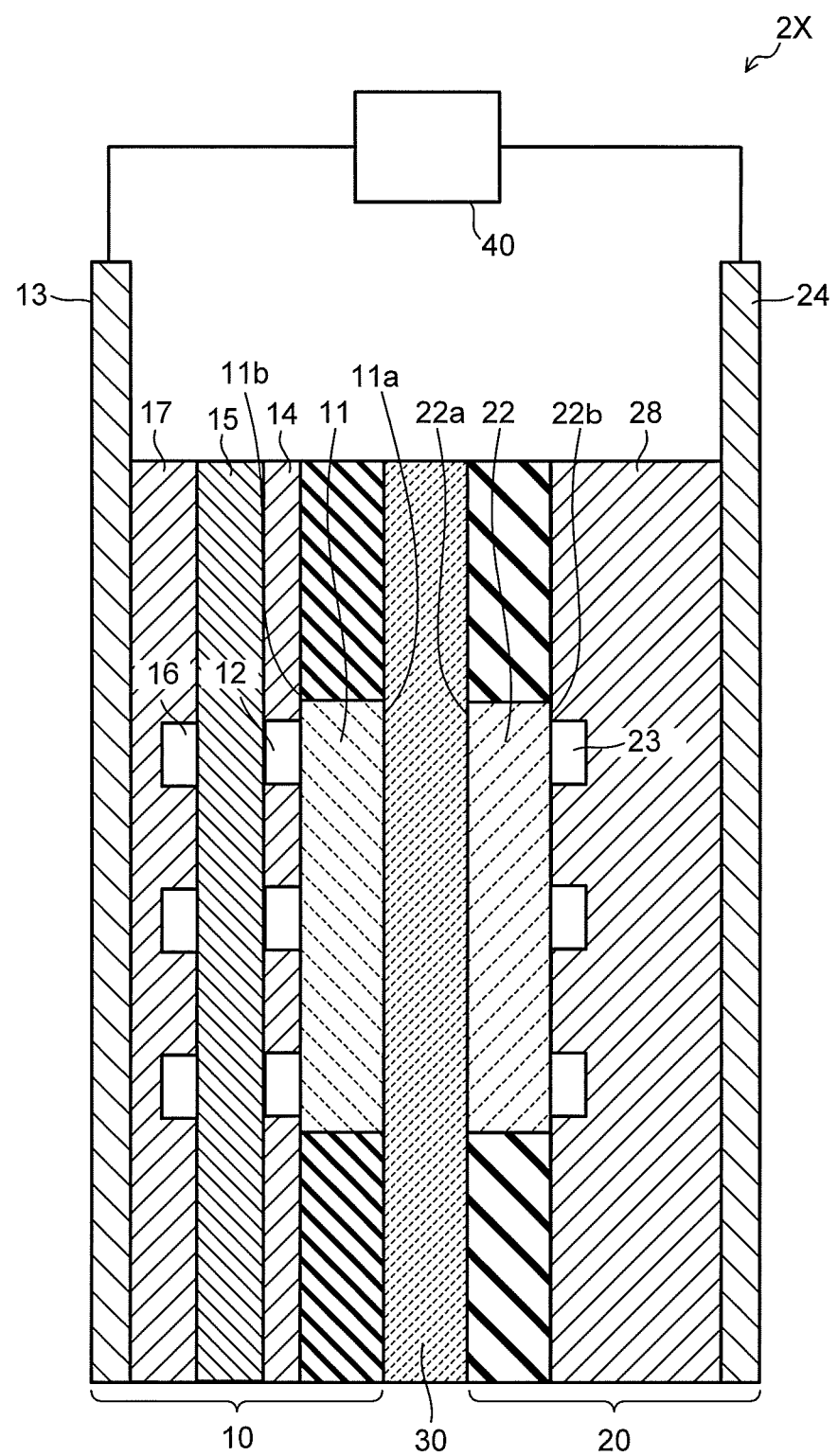
FIG. 15 is a sectional view illustrating an electrolysis cell of the electrolytic device illustrated in FIG. 14.

FIG. 14 is a view illustrating a configuration of a carbon dioxide electrolytic device according to a second embodiment, and FIG. 15 is a sectional view illustrating a configuration of an electrolysis cell in the electrolytic device illustrated in FIG. 14. A carbon dioxide electrolytic device 1X illustrated in FIG. 14 includes an electrolysis cell 2X, an anode solution supply system 100 which supplies an anode solution to the electrolysis cell 2X, a gas supply system 300 which supplies carbon dioxide ($CO_2$) gas to the electrolysis cell 2X, a product collection system 400 which collects a product produced by a reduction reaction in the electrolysis cell 2X, a control system 500 which detects a type and a production amount of the collected product, and performs control of the product and control of a refresh operation, a waste solution collection system 600 which collects a waste solution of the anode solution, and a refresh material source 700 which recovers an anode, a cathode, or the like of the electrolysis cell 2X, similarly to the carbon dioxide electrolytic device 1 according to the first embodiment.

The carbon dioxide electrolytic device 1X illustrated in FIG. 14 basically includes a configuration similar to that of the electrolytic device 1 illustrated in FIG. 1, except that a configuration of the electrolysis cell 2X is different. As illustrated in FIG. 15, the electrolysis cell 2X includes an anode part 10, a cathode part 20, and a separator 30. The anode part 10 includes an anode 11, an anode flow path 12, an anode current collector 13, a water-repellent porous body 15, and an anode flow path 16. The cathode part 20 includes a cathode 22, a cathode flow path 23, and a cathode current collector 24, and a cathode flow path 21 is not provided. Therefore, there need not be a component to supply a cathode solution to the cathode flow path 21. The power controller 40 is connected to the anode 11 and the cathode 22 via a current introduction member. Note that the anode part 10 may be constituted by, for example, appropriately combining the structures in FIG. 11 and FIG. 12.

The anode 11 preferably has a first surface 11a which is brought into contact with the separator 30, and a second surface 11b which faces the anode flow path 12. The first surface 11a of the anode 11 is brought into close contact with the separator 30. The anode flow path 12 is formed of a pit (groove portion/concave portion) provided in a flow path plate 14. The anode solution flows through inside the anode flow path 12 so as to be brought into contact with the anode 11. The anode current collector 13 is electrically brought into contact with a surface on a side opposite to the anode 11 of the flow path plate 14 which forms the anode flow path 12. The cathode 22 has a first surface 22a which is brought into contact with the separator 30, and a second surface 22b facing a cathode flow path 23. The cathode flow path 23 is formed of a pit (groove portion/concave portion) provided in a flow path plate 28. A cathode current collector 24 is electrically brought into contact with a surface on a side opposite to the cathode 22 of a flow path plate 28 forming the cathode flow path 23.

A gaseous substance supply system 710 and a rinse solution supply system 720 of a refresh material source 700 are connected to the anode flow path 12 and the cathode flow path 23 via pipes. The anode flow path 12 and the cathode flow path 23 are connected to a waste solution collection system 600 via pipes. A rinse solution discharged from the anode flow path 12 and cathode flow path 23 is collected in a waste solution collection tank 601 of the waste solution collection system 600. Gas for refresh discharged from the anode flow path 12 and the cathode flow path 23 is collected in a not-illustrated waste gas collection tank via the waste solution collection system 600, or discharged into the atmosphere. Composing materials of the respective parts, or the like are similar to those of the electrolytic device 1 of the first embodiment, and details thereof are as described above.

A cathode solution tank 202 has a function as a cathode discharge solution tank which houses liquid such as a rinse solution discharged from the cathode flow path 23 at a time of a refresh operation, for example. Note that a tank 106 may be connected to the cathode flow path 23 via the cathode solution tank 202 and the refresh material source 700. This allows the liquid to be used as the rinse solution when the liquid is housed in the tank 106.

In the electrolytic device 1X of the second embodiment, a start-up step S101 of the electrolytic device 1X and a $CO_2$ electrolysis operation step S102 are performed in a similar manner to the electrolytic device 1 of the first embodiment, except that supply of a cathode solution is not performed. Note that a reduction reaction of $CO_2$ in the cathode 22 is performed between $CO_2$ supplied from the cathode flow path 23 and the anode solution permeated the cathode 22 via the separator 30. A determination step S103 regarding whether or not the request criteria of the cell performance are satisfied, is also performed in a similar manner to the electrolytic device 1 of the first embodiment. When it is determined that the cell performance does not satisfy the request criteria, a refresh operation step S105 is performed. In the electrolytic device 1X of the second embodiment, the refresh operation step S105 is performed as follows.

First, a $CO_2$ reduction reaction is stopped. At this time, application of an electrolytic voltage performed by the power controller 40 may be maintained or stopped. Next, the anode solution is discharged from the anode flow path 12. Next, a rinse solution is supplied from the rinse solution supply system 720 to the anode flow path 12 and the cathode flow path 23, to thereby wash the anode 11 and the cathode 22. While the rinse solution is supplied, a refresh voltage may be applied between the anode 11 and the cathode 22, in a similar manner to the first embodiment. Next, gas is supplied from the gaseous substance supply system 710 to the anode flow path 12 and the cathode flow path 23, to thereby dry the anode 11 and the cathode 22. The gas and the rinse solution used for the refresh operation step are similar to those in the first embodiment. When the above refresh operation finishes, the anode solution is introduced into the anode flow path 12, and $CO_2$ gas is introduced into the cathode flow path 23. Subsequently, the $CO_2$ electrolysis operation is resumed. When the application of the electrolytic voltage performed by the power controller 40 is stopped, the application is resumed.

Also in the electrolytic device 1X of the second embodiment, based on whether or not the cell performance of the electrolysis cell 2X satisfies the request criteria, it is determined whether the $CO_2$ electrolysis operation is continued or the refresh operation is performed. By supplying the rinse solution and the gas in the refresh operation step, the deviation of the distribution of the ions in the vicinity of the anode 11 and the cathode 22, which becomes causes of reducing the cell performance, is solved, and the excess water in the cathode 22, the precipitation of the electrolyte in the anode 11 and the cathode 22, the flow path block thereby, and the like are removed. Therefore, by resuming the $CO_2$ electrolysis operation after the refresh operation step, the cell performance of the electrolysis cell 2X can be recovered. By repeating the $CO_2$ electrolysis operation and the refresh operation as above based on the request criteria of the cell performance, it becomes possible to maintain the $CO_2$ electrolysis performance obtained by the electrolytic device 1X for a long period of time.

When liquid passes through the separator 30 at a relatively low pressure, for example, a hydrophilic polytetrafluoroethylene (PTFE) porous body or the like is used, the rinse solution is supplied to only the anode flow path 12, and a pressure is applied to the liquid at an anode outlet by using a not-illustrated valve or the like or the anode outlet is blocked. Accordingly, the rinse solution passes through the separator 30, flows into the cathode 22, and the rinse solution flows out from a discharge port of the cathode 22. This makes it possible to perform the refresh of the cathode 22 and the refresh of the anode 11 at the same time. This configuration eliminates the necessity of the device which makes the rinse solution flow through the cathode 22, so that the device becomes compact in size, and further, the system is simplified, which is preferable.

Note that a pipe through which air gas is introduced into the cathode 22 may be connected to the cathode 22. At a time of the refresh, it is possible that gas containing air is supplied to the cathode 22, and a refresh voltage is applied between the anode 11 and the cathode 22, to thereby cause a water electrolysis reaction. On the anode 11 side, oxygen is generated by an oxidation catalyst, and generated protons move to the cathode 22 through the separator 30 or an electrolyte membrane. In the cathode 22, the protons and oxygen in the air are reacted by a cathode catalyst, resulting in that water is produced. By using the produced water, salts in the cathode can be dissolved to be discharged. Further, the produced water is pure water, so that it can be used to wash the cathode 22. At this time, impurities in the cathode 22 can be subjected to reduction treatment by using the protons moved to the cathode 22, and it is possible to regenerate the catalyst and the members. This configuration eliminates the necessity of the device which supplies the rinse solution to the cathode 22, so that the device becomes compact in size, and further, the system is simplified, which is preferable. Further, when, before the flow of the $CO_2$ gas to be performed thereafter, the air flowed through the cathode is stopped, the generated protons react with each other to generate hydrogen, which also enables to push out generated water. When the oxygen-containing gas is stopped before performing push with $CO_2$, a regeneration function of the catalyst and the members provided by the protons can become more effective. This is because other catalysts which are difficult to be reduced and the respective members of the cathode 22 are reduced, due to the absence of oxygen. Concretely, there can be cited organic matters of impurities, metal oxides, and the like. When $CO_2$ is supplied thereafter to cause a reaction, it is possible to further expect a refresh effect.

EXAMPLES

Example 1

An electrolytic device illustrated in FIG. 14 was fabricated, and an electrolysis performance of carbon dioxide was examined. First, on a carbon paper provided with a porous layer, a cathode to which carbon particles on which gold nanoparticles were supported were applied, was produced by the following procedure. A coating solution in which the carbon particles on which the gold nanoparticles were supported, pure water, a Nafion solution, and ethylene glycol were mixed was produced. An average particle diameter of the gold nanoparticles was 3 nm, and a supported amount thereof was 10 mass %. The coating solution was filled in an air brush, and spray-coated on the carbon paper provided with the porous layer, by using Ar gas. After the coating, washing was performed by flowing pure water for 30 minutes, and thereafter, the organic matter such as ethylene glycol was oxidized to be removed through immersion in a hydrogen peroxide solution. This was cut into a size of 2×2 cm to be set as the cathode. Note that a coating amount of Au was estimated as about 0.4 mg/cm$^2$ from a mixing amount of the gold nanoparticles and the carbon particles in the coating solution. For an anode, an electrode in which $IrO_2$ nanoparticles to be a catalyst were applied to Ti mesh was used. As the anode, one in which $IrO_2$/Ti mesh was cut into 2×2 cm was used. A catalyst area was set to 4 cm$^2$.

As illustrated in FIG. 14, the electrolysis cell 2 was produced in a manner that the cathode current collector 24, the cathode flow path 23 (the flow path plate 28), the cathode 22, the separator 30, the anode 11, and the anode flow path 12, the water-repellent porous body 15, the anode flow path 16, and the anode current collector 13 were stacked in this order from the top, the stack was sandwiched by the not-illustrated support plates, and tightened by the bolts. For the separator 30, a PTFE porous body (product name: POREFLON, manufactured by Sumitomo Electric Industries, Ltd.) after being subjected to hydrophilic treatment was used. For the water-repellent porous body 15, HW-060-10 manufactured by Sumitomo Electric Industries, Ltd. was used. The $IrO_2$/Ti mesh of the anode 11 was brought into close contact with the PTFE porous body. Note that an evaluation temperature was set to room temperature.

The electrolytic device 1 illustrated in FIG. 14 was fabricated using the above-described electrolysis cell 2, and the electrolytic device was operated under the following condition. $CO_2$ gas was supplied to the cathode flow path 23 of the electrolysis cell 2 at 60 sccm, and a liquid trap was provided at a flow path outlet. An aqueous potassium hydrogen carbonate solution (concentration 1 M $KHCO_3$) of 300 mL was introduced into the anode flow path 12 at a flow rate of 2 mL/min to be circulated. Next, by controlling a voltage with the use of the power controller, a constant current of 400 mA was made to flow between the anode 11 and the cathode 22 at a constant current density of 100 mA/cm$^2$, an electrolytic reaction of $CO_2$ was caused, and a cell voltage at that time was measured, and collected by the data collection and controller. Further, a part of gas output from the cathode flow path 23 was collected, and production amounts of CO gas produced by a reduction reaction of $CO_2$ and $H_2$ gas produced by a reduction reaction of water were analyzed by a gas chromatograph. In the data collection and controller, based on the gas production amounts, a partial current density of CO or $H_2$, and Faradaic efficiency being a ratio between the entire current density and the partial current density were calculated and collected. Similarly, a production amount of CO or $H_2$ gas in the anode solution flow path was analyzed by the gas chromatograph. Table 1 presents the results.

After about 20 minutes after starting the operation, a cell voltage was 2.61 V, a Faradaic efficiency of CO was 95%, and a Faradaic efficiency of $H_2$ was 2.6%. Further, a concentration of CO in the anode 11 was 65 ppm. This indicates that an amount of CO moved from the cathode 22 to the anode 11 is small. An amount in which CO is oxidized to $CO_2$ in the anode 11 again is also included, so that it is found from a rise in voltage and a reduction in a CO amount at an outlet port of the cathode flow path 23 that cell efficiency improves.

An initial pH of the anode solution was 8.8, but a pH after one-hour operation was 7.7. This is caused by the effect of $CO_2$ moved from the cathode 22 to the anode 11 dissolving in the anode solution, but this is because a reduction amount of pH is suppressed as compared with Comparative Example 1 to be described later and the amount of CO moved from the cathode 22 to the anode 11 reduces. It was possible to confirm that stability of pH greatly affected operation sustainability and the configuration of this embodiment was more capable of the sustained operation. There were few air bubbles of gas at an outlet port of the anode flow path 12.

Comparative Example 1

An experiment was performed under the conditions similar to those of Example 1, except that the water-repellent porous body 15 and anode flow path 16 were not provided. Table 1 presents the results.

After about 20 minutes after starting the operation, a cell voltage was 2.88 V, a Faradaic efficiency of CO was 91.1%, and a Faradaic efficiency of $H_2$ was 7.2%. Further, a concentration of CO in the anode was 235 ppm. This indicates that the amount of CO moved from the cathode 22 to the anode 11 is large.

An initial pH of the anode solution was 8.8, but a pH after one-hour operation was 7.4. There were many air bubbles of gas at the outlet port of the anode flow path 12, and a volume of a gas component was larger than that of the anode solution. The operation was made as it was, resulting in that the cathode flow path 21 was clogged with salts produced by $CO_2$ gas in the vicinity of the cathode 22 reacting with potassium ions moved from the anode 11 to the cathode 22, after 2.5 hours, to stop a reaction of the electrolysis cell 2.

Comparative Example 2

An experiment was performed under the conditions similar to those of Comparative Example 1, except that a flow rate of the aqueous potassium hydrogen carbonate solution into the anode flow path was set to 10 ccm. Table 1 presents the results.

After about 20 minutes after starting the operation, a cell voltage was 2.85 V, a Faradaic efficiency of CO was 93.2%, and a Faradaic efficiency of $H_2$ was 4.2%. Further, a concentration of CO in the anode 11 was 189 ppm. This indicates that the amount of CO moved from the cathode 22 to the anode 11 is large. Although increasing the flow rate improved more performance than that in Comparative Example 1, it was not possible to obtain such a cell performance as was obtained in Example 1.

Examples 2 to 4

Experiments were performed under the conditions similar to those of Example 1, except that the respective flow rates of the aqueous potassium hydrogen carbonate solutions into the anode flow paths were set to 4, 6, 10 ccm. Table 1 presents the results. It is found from the results in Table 1 that almost similar results to those of Example 1 can be obtained even though the flow rates are different. When the flow rate is increased, the cell voltage slightly decreases, the Feradaic efficiency of CO improves, resulting in that a slight efficiency improvement can be confirmed, but because an electrolytic solution flow rate is increased, a pressure loss increases, and there is a need to take an increase in energy of a pump or the like, pressure resistance in a device configuration, and the like into consideration, resulting in that the electrolytic solution flow rate is preferably small. However, when Examples 2 to 4 are compared with Comparative Example 2, it is found that the performance significantly improves.

Example 5

An experiment was performed under the conditions similar to those of Example 1 except that the anode flow path 16 was not provided, the water-repellent porous body 15 having a size equal to that of the flow path plate 14 was used, oxygen gas after being subjected to gas/liquid separation was moved through the water-repellent porous body 15 in the same direction as the flow path surface without providing a gasket, and the oxygen was discharged outside from the electrolysis cell 2. Table 1 presents the results.

After about 20 minutes after starting the operation, a cell voltage was 2.71 V, a Faradaic efficiency of CO was 94.2%, and a Faradaic efficiency of $H_2$ was 3.0%. Further, a concentration of CO in the anode was 75 ppm. It is found from this that performance improves more than that in Comparative Example 1 and the electrolytic device has a similar cell performance to that in Example 1. There was little movement of the gas from the anode flow path 12 similarly to Example 1.

Example 6

An experiment was performed under the conditions similar to those of Example 1, except that the flow path plate 14 was a water-repellent porous body having conductivity. Table 1 presents the results. As the water-repellent porous body having conductivity, Sigracet 28BC manufactured by SGL GmbH & Co. KG was used.

After about 20 minutes after starting the operation, a cell voltage was 2.7 V, a Faradaic efficiency of CO was 95.3%, and a Faradaic efficiency of $H_2$ was 2.8%. Further, a concentration of CO in the anode was 69 ppm. It is found from this that performance improves more than that in Comparative Example 1 and the electrolytic device has a similar cell performance to that in Example 1. There was little emigration of the gas from the anode flow path 12 similarly to Example 1.

Example 7

An experiment was performed under the conditions similar to those of Example 1, except that a device which cooled gas discharged from the anode flow path 16 at room temperature and separated water vapor and water was provided, and water was supplied to an inlet port of the cathode flow path 23 every one hour by using a pump. The cathode flow path 23 was blocked with salts after 2.5 hours in Comparative Example 1, but even though a 24-hour operation was made, the block of the cathode flow path 23 was not confirmed, and the sustained operation was possible.

Example 8

Figure 16:
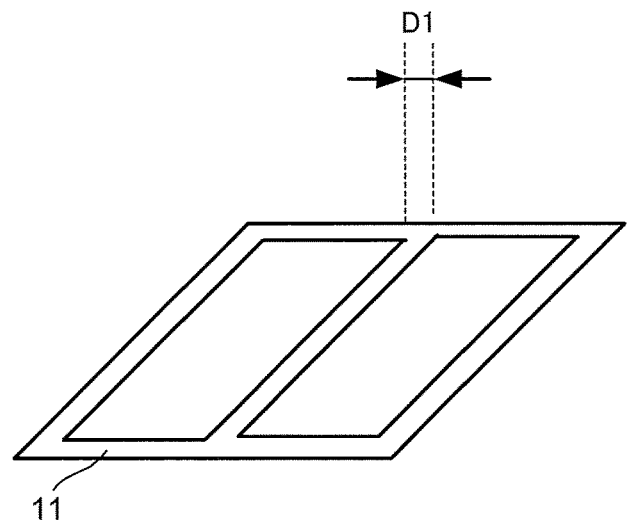
FIG. 16 is a view illustrating an example of an anode.
Figure 17:
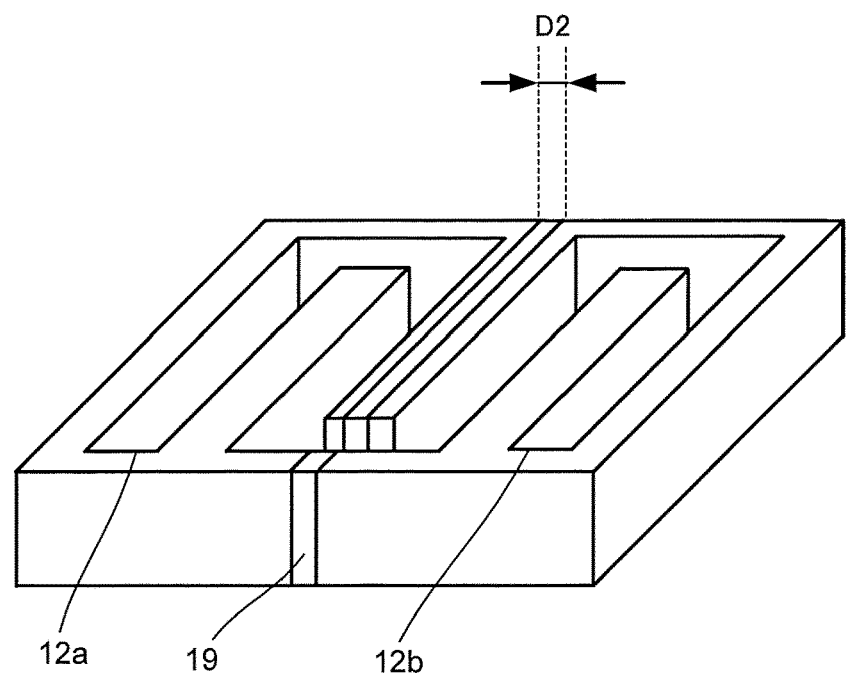
FIG. 17 is a view illustrating an example of a flow path plate.

FIG. 16 is a view illustrating the anode 11 to be used in Example 8, and FIG. 17 is a view illustrating an example of the flow path plate 14 to be used in Example 8. As illustrated in FIG. 17, the anode flow path 12 was divided into a front half portion 12a and a rear half portion 12b, and the front half portion 12a and the rear half portion 12b were separated by an insulating sheet 19 (PTFE sheet) so that current values of the respective portions could be individually measured. A catalyst layer of the anode 11 was formed with the same area so as to overlap with each of the front half portion 12a and the rear half portion 12b, and the anode 11 was not formed in an overlapping portion with the insulating sheet 19. A catalyst area was set to 4 $cm^2$ similarly to Example 1. Note that an interval D1 of a catalyst region between the front half portion 12a and the rear half portion 12b was set to be the same as a width D2 of the insulating sheet 19.

The reaction was performed in a manner that the current values were adjusted so as to be 200 mA in each of the front half portion 12a and the rear half portion 12b and became 400 mA in total. An experiment was performed under the conditions similar to those of Example 1 except the above. Table 1 presents the results. It was possible to confirm, from cell voltages, that almost equal reaction was preformed in the front half portion 12a and the rear half portion 12b.

Comparative Example 3

An experiment was performed under the conditions similar to those of Example 8, except that the water-repellent porous body 15 and anode flow path 16 were not provided. Table 1 presents the results. The cell voltage of the rear half portion 12b is 2.95 V in contrast to 2.86 V for the cell voltage of the front half portion 12a, to be high. This is because air bubbles generated in a flow path of the rear half portion 12b are more than those in a flow path of the front half portion 12a and the cell performance is reduced by a reduction in an active area of the catalyst. It was possible to confirm a reduction in performance as compared with Example 8.

TABLE 1

| | Total Current Value (mA) | Cell Voltage (V) | Anode Solution Flow Rate (ccm) | Faradaic Efficiency Co (%) | Faradaic Efficiency $H_2$ (%) | Anode Co Concentration |
|---|---|---|---|---|---|---|
| Example 1 | 400 | 2.68 | 2.0 | 95.0 | 2.6 | 65 ppm |
| Comparative Example 1 | 400 | 2.88 | 2.0 | 91.1 | 7.2 | 235 ppm |
| Comparative Example 2 | 400 | 2.84 | 10.0 | 93.2 | 4.2 | 189 ppm |
| Example 2 | 400 | 2.68 | 4.0 | 95.1 | 2.5 | 63 ppm |
| Example 3 | 400 | 2.67 | 6.0 | 95.2 | 2.5 | 66 ppm |
| Example 4 | 400 | 2.67 | 10.0 | 95.2 | 2.4 | 62 ppm |
| Example 5 | 400 | 2.71 | 2.0 | 94.2 | 3.0 | 75 ppm |

TABLE 1-continued

|  |  | Total Current Value (mA) | Cell Voltage (V) | Anode Solution Flow Rate (ccm) | Faradaic Efficiency Co (%) | Faradaic Efficiency $H_2$ (%) | Anode Co Concentration |
|---|---|---|---|---|---|---|---|
|  | Example 6 | 400 | 2.70 | 2.0 | 95.3 | 2.8 | 69 ppm |
|  | Example 7 | 400 | 2.67 | 2.0 | 95.5 | 2.3 | 64 ppm |
| Example 8 | Front Half Portion | 200 | 2.68 | 2.0 | — | — | — |
|  | Rear Half Portion | 200 | 2.69 | 2.0 | — | — | — |
| Comparative Example 3 | Front Half Portion | 200 | 2.86 | 2.0 | — | — | — |
|  | Rear Half Portion | 200 | 2.95 | 2.0 | — | — | — |

Note that configurations of the above-described respective embodiments may be each applied in combination, and further may be partially substituted. Herein, while certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. A carbon dioxide electrolytic device comprising an electrolysis cell including:
    a cathode to reduce a first substance containing carbon dioxide and thus produce a first product containing a carbon compound;
    a cathode flow path which faces the cathode and through which a gas containing the carbon dioxide flows;
    an anode to oxidize a second substance containing water or a hydroxide and thus produce a second product containing oxygen;
    an anode flow path which faces the anode and through which an electrolytic solution containing the water or the hydroxide flows;
    a water-repellent porous body which faces the anode flow path and through which the second product flows;
    a separator provided between the anode and the cathode, and
    the anode flow path being disposed between the anode and the water-repellent porous body.

2. The device according to claim 1,
    wherein the water-repellent porous body has a sheet shape.

3. The device according to claim 1,
    wherein the cathode, the separator, the anode, and the water-repellent porous body are stacked on one another.

4. The device according to claim 1,
    wherein the water-repellent porous body has conductivity.

5. The device according to claim 1,
    wherein the electrolysis cell further includes
    a hydrophilic porous body on the water-repellent porous body.

6. The device according to claim 1,
    wherein the electrolysis cell further includes:
    a first flow path plate having the cathode flow path; and
    a second flow path plate having the anode flow path, and
    the first flow path plate has a first land on the anode,
    the second flow path plate has a second land on the cathode, and
    the second land overlaps the first land.

7. The device according to claim 1,
    wherein the electrolysis cell further includes
    a flow path plate having the anode flow path, and
    the flow path plate has a second water-repellent porous body which faces the anode flow path and through which the second product flows.

8. The device according to claim 1,
    wherein the electrolysis cell further includes
    a second anode flow path which faces the water-repellent porous body, to discharge the second product through the water-repellent porous body, and
    the water-repellent porous body is provided between the anode flow path and the second anode flow path.

9. The device according to claim 8,
    wherein the electrolysis cell has
    a third flow path plate having the second anode flow path, and
    the third flow path plate is stacked on the water-repellent porous body.

10. The device according to claim 8,
    wherein the electrolysis cell further includes:
    a first flow path plate having the cathode flow path;
    a second flow path plate having the anode flow path; and
    a third flow path plate having the second anode flow path, and
    the first flow path plate has a first land on the anode,
    the second flow path plate has a second land on the cathode,
    the second land overlaps the first land, and
    the second anode flow path overlaps the second land.

11. The device according to claim 1, further comprising a discharge flow path to discharge the second product from the anode flow path.

12. The device according to claim 1, further comprising a second discharge flow path to discharge the second product through the water-repellent porous body.

13. The device according to claim 1, further comprising:
    a tank to store the electrolytic solution; and
    a circulation flow path to supply a fluid to be discharged through the water-repellent porous body to the tank.

14. The device according to claim 1, further comprising a circulation flow path to supply a fluid to be discharged through the water-repellent porous body to the cathode flow path.

15. A carbon dioxide electrolytic device comprising an electrolysis cell including:
    a cathode to reduce a first substance containing carbon dioxide and thus produce a first product containing a carbon compound;
    a cathode flow path which faces the cathode and through which a gas containing the carbon dioxide flows;
    an anode to oxidize a second substance containing water or a hydroxide and thus produce a second product containing oxygen;

an anode flow path which faces the anode and through which an electrolytic solution containing the water or the hydroxide flows;

a water-repellent porous body which faces the anode flow path and through which the second product flows;

a separator provided between the anode and the cathode; and a flow path plate having a second anode flow path which faces the water-repellent porous body, to discharge the second product through the water-repellent porous body, the flow path plate being stacked on the water-repellent porous body, and the water-repellent porous body being provided between the anode flow path and the second anode flow path.

* * * * *